(12) United States Patent
DeVries

(10) Patent No.: US 12,497,248 B2
(45) Date of Patent: Dec. 16, 2025

(54) CONVEYOR BELT CLEANER BLADE WEAR MONITORING SYSTEM

(71) Applicant: Flexible Steel Lacing Company, Downers Grove, IL (US)

(72) Inventor: Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 165 days.

(21) Appl. No.: 18/237,262

(22) Filed: Aug. 23, 2023

(65) Prior Publication Data

US 2024/0067456 A1    Feb. 29, 2024

Related U.S. Application Data

(60) Provisional application No. 63/452,616, filed on Mar. 16, 2023, provisional application No. 63/400,224, filed on Aug. 23, 2022.

(51) Int. Cl.
*B65G 43/02* (2006.01)
*B65G 45/12* (2006.01)

(52) U.S. Cl.
CPC ............. *B65G 43/02* (2013.01); *B65G 45/12* (2013.01)

(58) Field of Classification Search
None
See application file for complete search history.

(56) References Cited

U.S. PATENT DOCUMENTS

| 4,587,852 A | 5/1986 | Butler |
| 6,291,991 B1 | 9/2001 | Schnell |
| 6,374,990 B1 | 4/2002 | Swinderman |

(Continued)

FOREIGN PATENT DOCUMENTS

| CN | 211594063 | 9/2020 |
| EP | 0776839 | 3/2001 |

(Continued)

OTHER PUBLICATIONS

"A Novel Mining Conveyor Belt Modelling for UHF RFID Sensor based Health Monitoring", Tuz Zohra et al.; Oct. 27, 2021, 5 pages.

(Continued)

*Primary Examiner* — Kavel Singh
(74) *Attorney, Agent, or Firm* — Fitch, Even, Tabin & Flannery LLP

(57) ABSTRACT

A system and apparatus are provided for monitoring one or more characteristics of a scraper blade of a belt cleaner system. The system and apparatus may be configured to monitor the amount of wear of the scraper blade. The system and apparatus may include a self-contained wear monitoring unit which includes one or more sensors for detecting scraper blade wear. The sensor may be a wear sensor including one or more conductive wear indicators on a circuit board, wherein the circuit board is positioned and adapted to be worn down along with the scraper blade due to abrasion with the conveyor belt, such that portions of the conductive wear indicator disposed on the circuit board will also be worn away as the scraper blade is worn down. The wear monitoring unit may be configured to be retrofit to an existing scraper blade without any modification to the scraper blade.

32 Claims, 19 Drawing Sheets

(56) References Cited

U.S. PATENT DOCUMENTS

| | | |
|---|---|---|
| 6,516,943 B2 | 2/2003 | Engle |
| 6,591,969 B2 | 7/2003 | Swinderman |
| 6,986,418 B2 | 1/2006 | Swinderman |
| 6,988,610 B2 | 1/2006 | Fromme |
| 7,066,314 B2 | 6/2006 | Whiteman |
| 7,093,706 B2 | 8/2006 | DeVries et al. |
| 7,131,525 B2 | 11/2006 | Swinderman |
| 7,259,854 B2 | 8/2007 | Schnell |
| 7,427,767 B2 | 9/2008 | Kemp |
| 7,472,784 B2 * | 1/2009 | Swinderman .......... B65G 45/12 198/502.2 |
| 7,624,857 B2 | 12/2009 | Kuesel |
| 7,673,740 B2 | 3/2010 | Kuesel |
| 7,740,128 B2 | 6/2010 | Wallace |
| 7,779,994 B1 | 8/2010 | Travis |
| 7,810,634 B2 | 10/2010 | Wallace |
| 7,866,457 B2 | 1/2011 | Swinderman |
| 7,894,934 B2 | 2/2011 | Wallace |
| 7,928,922 B2 | 4/2011 | King |
| 7,987,966 B2 | 8/2011 | Devries et al. |
| 8,069,975 B2 | 12/2011 | Wallace |
| 8,256,607 B2 | 9/2012 | Wallace |
| 8,267,239 B2 | 9/2012 | Swinderman |
| 8,387,776 B2 | 3/2013 | Buchkremer |
| 8,387,777 B2 | 3/2013 | Tokhtuev |
| 8,657,105 B2 | 2/2014 | Twigger |
| 8,662,290 B2 | 3/2014 | Twigger |
| 9,316,285 B2 | 4/2016 | Demont |
| 9,702,853 B2 | 7/2017 | Wallace |
| 9,776,799 B2 | 10/2017 | Ulchak |
| 10,183,810 B2 | 1/2019 | Kaltenhäuser |
| 10,351,351 B2 * | 7/2019 | Schulte Strathaus .. B65G 45/16 |
| 10,801,902 B2 | 10/2020 | Kleczewski |
| 10,836,585 B2 * | 11/2020 | DeVries ................. B65G 43/00 |
| 11,559,865 B2 * | 1/2023 | Vorpahl ................. B08B 1/165 |
| 12,116,213 B2 | 10/2024 | Airola |
| 2003/0230466 A1 | 12/2003 | Swinderman et al. |
| 2004/0262132 A1 | 12/2004 | Pauley |
| 2007/0222261 A1 | 9/2007 | True |
| 2008/0053791 A1 | 3/2008 | Swinderman |
| 2009/0194391 A1 | 8/2009 | Lagneaux |
| 2011/0067197 A1 | 3/2011 | Mott |
| 2012/0012443 A1 | 1/2012 | Sakaguchi |
| 2012/0043980 A1 | 2/2012 | Davies |
| 2013/0206545 A1 | 8/2013 | Bogle |
| 2019/0002207 A1 | 1/2019 | Schulte Strathaus |
| 2019/0144209 A1 | 5/2019 | Happe |
| 2019/0193946 A1 | 6/2019 | Devries |

FOREIGN PATENT DOCUMENTS

| | | |
|---|---|---|
| RU | 2753055 | 8/2021 |
| WO | 2019153056 | 8/2019 |
| WO | 2019175336 | 9/2019 |
| WO | 2019206505 | 10/2019 |
| WO | 2020253905 | 12/2020 |
| WO | 2021151577 | 8/2021 |
| WO | 2021164828 | 8/2021 |

OTHER PUBLICATIONS

Xerafy Roswell Datasheet, 2 pages, accessed online Feb. 23, 2022 at https://xerafy.com/wp-content/uploads/2022/08/Xerafy-ROSWELL-Datasheet.pdf.
Xerafy XS Dot Datasheet, 2 pages, accessed online Feb. 23, 2022 at https://xerafy.com/wp-content/uploads/2022/08/Xerafy-XS-Dot-Datasheet.pdf.
"Conveyor Diagnostics", Fenner Dunlop Conveyor Diagnostics; Aug. 28, 2019, 12 pages.
International Search Report and the Written Opinion for PCT/US2023/017369, mail date Jun. 21, 2023, 11 pages.
International Search Report and Written for PCT/US2023/030800, mail date Nov. 7, 2023, 28 pages.
U.S. Appl. No. 18/130,688; Non-Final Rejection mailed Dec. 20, 2024; (pp. 1-7).
U.S. Appl. No. 18/130,688; Notice of Allowance and Fees Due (PTOL-85) mailed Apr. 7, 2025; (pp. 1-5).

* cited by examiner ations.

CONVEYOR BELT CLEANER BLADE WEAR MONITORING SYSTEM

CROSS-REFERENCE TO RELATED APPLICATIONS

This application claims benefit under 35 U.S.C. § 119(e) to U.S. Provisional Application No. 63/400,224, filed Aug. 23, 2022, and to U.S. Provisional Application No. 63/452,616, filed Mar. 16, 2023, which are each hereby incorporated by reference herein in their entirety.

FIELD OF THE INVENTION

This disclosure relates to an apparatus and system for monitoring components of a conveyor system, and more particularly, to a conveyor belt cleaner blade wear monitoring apparatus and system.

BACKGROUND OF THE INVENTION

Conveyor systems are utilized to transport materials or objects from one location to another. Based on the material transported and the ambient conditions surrounding the conveyor belt, material can become undesirably affixed to the belt. The material can be removed from the belt in a number of ways, including, but not limited to the use of a belt cleaner apparatus.

A belt cleaner apparatus cleans the belt in place, during operation, via a scraping action thereagainst. A belt cleaner apparatus typically will include a cleaner blade or blades which can have a scraper or tip end that is biased into engagement with the belt surface, usually on the return run of the belt (secondary belt cleaners) or at the head pulley (primary belt cleaners). In either type of belt cleaner, the scraper blade will typically be mounted to an elongate pole extending below and across the belt to the frame structure of the conveyor system on either side of the belt for being operatively supported thereby. In this regard, the opposite ends of the pole each can be mounted to a biasing unit secured to frame structures for providing an upward and/or rotary bias force for urging the scraper blade into engagement with the belt surface.

The scraper blades are typically biased into engagement with the belt to allow them to resiliently shift away from the belt when surface irregularities on the belt are encountered such as due to metallic splices extending across the belt that run past the scraper blades during conveyor belt operations. Due to the friction and impacts with the belt, the scraper blades wear down over time so that they no longer efficiently or effectively scrape material from the conveyor belt.

Because of their position in contact with the belt, and in the case of secondary belt cleaners, which are positioned underneath the conveyor belt in contact with the return run of the conveyor belt, monitoring the amount of wear on the scraper blades visually can be difficult. Further, it may not always be possible or practicable to stop the operation of the belt to safely view the condition of the scraper blades. Accordingly, it would be desirable to be able to monitor the condition of one or more scraper blades of a belt cleaner apparatus without needing to rely solely on visual inspections.

DETAILED DESCRIPTION

In accordance with one aspect of the present disclosure, a system and apparatus are provided for monitoring one or more characteristics of a scraper blade of a belt cleaner system. In one preferred form, the system and apparatus are configured to monitor the amount of wear of the scraper blade. The system and apparatus may include a self-contained wear monitoring unit which includes one or more sensors for detecting scraper blade wear. In one form, the sensor may be a wear sensor including one or more conductive wear indicators on a circuit board, wherein the circuit board is positioned and adapted to be worn down along with the scraper blade due to abrasion with the conveyor belt, such that portions of the conductive wear indicator disposed on the circuit board will also be worn away as the scraper blade is worn down. Advantageously, the wear monitoring unit may be configured to be retrofit to an existing scraper blade without any modification to the scraper blade.

The wear monitoring unit associated with the conveyor belt scraper blade may be in operable communication with and monitored by a multipurpose conveyor monitoring system, such as the various systems disclosed in U.S. Pat. No. 10,836,585, which is incorporated by reference as if reproduced herein in its entirety. The multipurpose conveyor monitoring system monitors other sensors associated with ancillary devices of the conveyor system, such as belt cleaner systems and associated scraper blades, splices and splice fasteners, idler rollers, trackers, and/or impact beds, as well as the conveyor belt and its operation as well. The one or more sensors may be associated with the ancillary devices in a number of approaches, such as being integrated with the ancillary devices, mounted to or adjacent to the ancillary devices, mounted to support structure for the ancillary devices and/or mounted to frame members of the structure supporting the conveyor belt proximate the ancillary devices.

The ancillary devices may include portions with relatively short expected lifespans, such as intended wear or replaceable portions, and portions with relatively long expected lifespans, or permanent portions. Although referred to herein as being "permanent," the permanent portions may deteriorate over time and are capable of being replaced. The permanent portions have a longer predicted lifespan and are designed to outlast the "replaceable portions." For example, the replaceable portion of a belt cleaner may be wear portions such as the scraping blades and scraper tips of the belt cleaner and the permanent portion of the belt cleaner may be an elongated, rigid mounting structure, such as an elongate base member or support pole, of the belt cleaner. As another example, the permanent portion is a portion of a frame of the conveyor system to which the ancillary devices are mounted.

Figure 1:
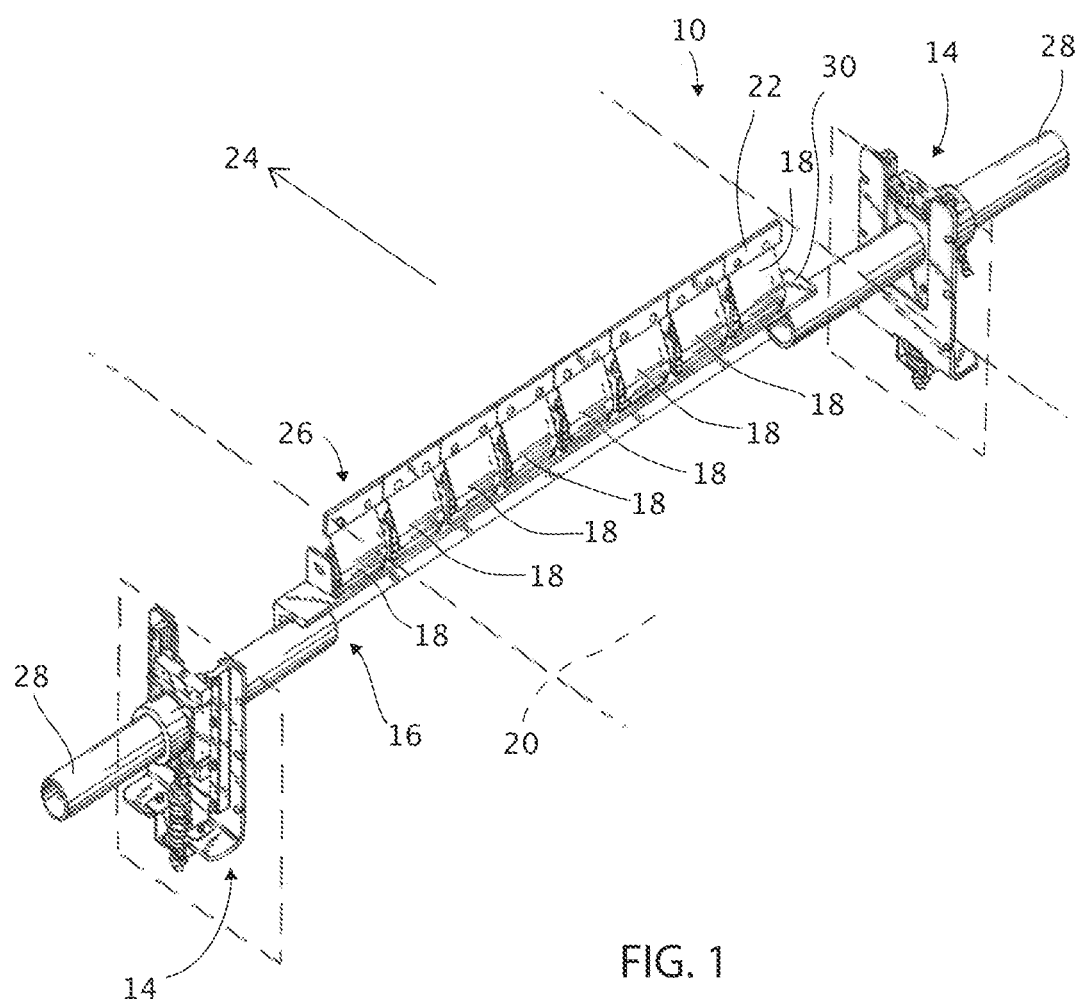
FIG. 1 is a perspective view of an exemplary belt cleaner system showing a plurality of cleaning blades mounted to a support pole assembly for being biased into engagement with a conveyor belt.

In FIG. 1, an exemplary belt cleaner apparatus or system 10 is illustrated. Belt cleaner system 10 employs a plurality of scraper blades 22 arranged in side-by-side orientation for extending across the width of the conveyor belt 20 to be cleaned so that the blades 22 are aligned in a lateral direction transverse to the longitudinal downstream travel direction 24 of the belt 20. As used herein and as understood by one of skill in the art, the term "downstream" or "downstream side" generally refers to a surface of a component facing at least partially in the same general direction as the downstream travel direction 24 (or the radial travel direction 624 with respect to the belt cleaner system 610 shown in FIG. 15) or to a position of a component located relatively further along the downstream travel direction 24 (or radial travel direction 624) than another component, such as the scraping edge of scraper blades. Conversely, the term "upstream" or "upstream side" generally refers to a surface of a component facing at least partially in a direction generally opposite to the downstream travel direction 24 (or radial travel direction 624) or to a position of a component located relatively further along in a direction generally opposite to the downstream travel direction 24 (or radial travel direction 624) than another component, such as the scraping edge of the scraper blades 22. The scraper blades 22 are each attached to a blade mount member 18 which resiliently keeps the blade 22 in engagement with the belt 20. The scraper blades 22 and blade mount members 18 are each part of a modular cleaning unit 26 that are each mounted to an elongate support assembly 16 for supporting the modular cleaning units 26 with the scraper blades 22 in contact with the belt 20. Each cleaning unit 26 is modular in that it is substantially identical to and interchangeable with the other modular cleaning units 26 and are configured for use together when mounted to the elongate support assembly 16. The elongate support or support assembly 16 is mounted transversely below the return run of the belt 20 via opposing resilient mounts such as spring tensioners 14 to a support frame 220 of the conveyor system 200 (see FIG. 9). The elongate support or support assembly 16 in the embodiment shown includes opposing pole members 28 which have an elongate right angle bracket 30 affixed therebetween. The modular cleaning units 26 are secured to an upper horizontally extending leg of the right angle bracket 30 by bolting of a U-shaped base bracket 32 of the cleaning unit 26 thereto.

Figure 2:
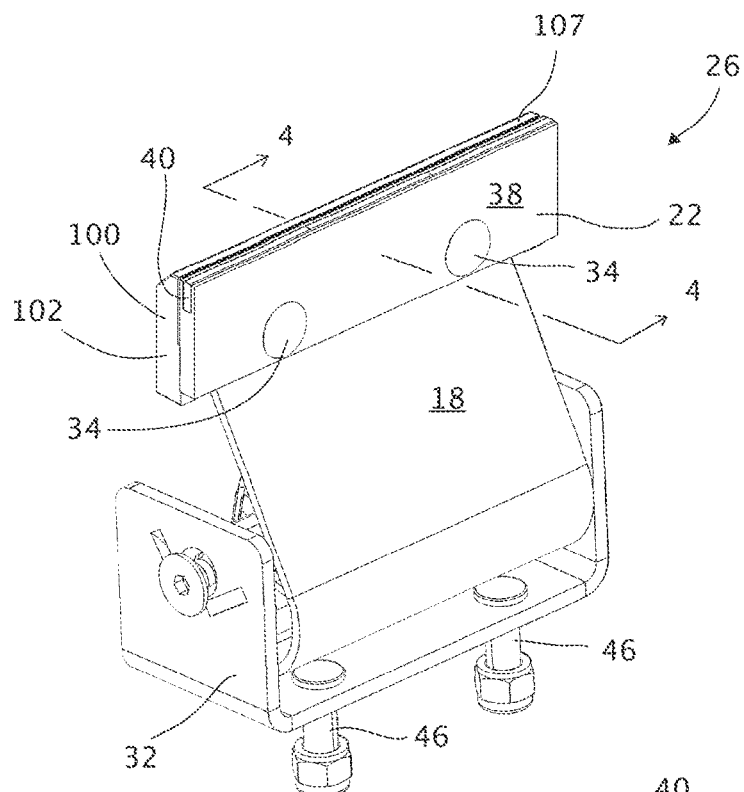
FIG. 2 is a perspective view of a modular cleaning unit for use with the belt cleaner system of FIG. 1 including a scraper blade and a wear monitoring unit attached to the downstream side of the scraper blade and a scraper blade mount, the scraper blade mount including an angled spring plate member for biasing the scraper blade into engagement with the conveyor belt.
Figure 3:
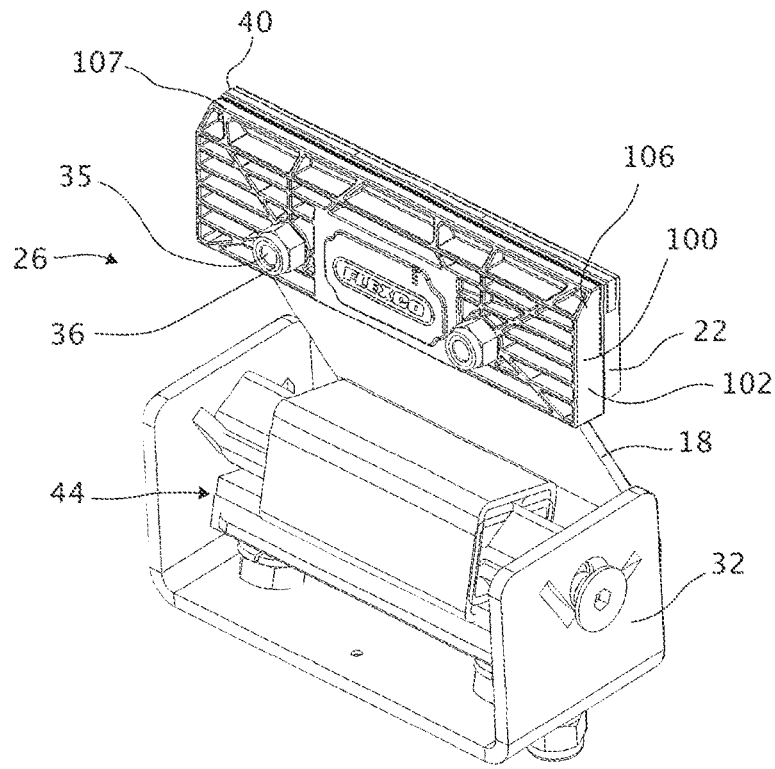
FIG. 3 is a perspective view of the modular cleaning unit of FIG. 2 showing the downstream side of a ribbed housing of the wear monitoring unit.

As shown in FIGS. 2 and 3, a modular cleaning unit 26 is shown which includes a sensor module in the form of wear monitoring unit 100 attached to a downstream side of the scraper blade 22 and blade mount member 18. The scraper blade 22 includes a main blade body 38 and a plurality of blade tips 40 of a harder material than the blade body 38, such as tungsten carbide. The blade tips 40 are mounted in a transverse elongate channel 42 formed in an uppermost extent of the main blade body 38, such that thinner upstream and downstream extensions of the main blade body 38 are positioned in engagement with each elongate side of the blade tips 40.

The scraper blade 22 is fixed to an upstream side of the blade mount member 18 with bolts 34. The blade mount member 18 is resilient, has a curved configuration and is mounted to a torsion bias mechanism 44, such as that disclosed in U.S. Pat. No. 7,093,706, which is hereby incorporated by reference in its entirety. The torsion bias mechanism 44 includes a generally U-shaped base bracket 32 which is adapted to be fastened to the elongate support assembly 16 via bolts 46. Accordingly, the cleaner blades 22 are secured directly to a first resilient mount in the form of blade mount member 18, and a second resilient mount in the form of the torsion bias mechanism 44 secured to the elongate support assembly 16.

The wear monitoring unit 100 includes a housing 102 which is adapted to be connected to an exterior of the scraper blade 22, and more particularly at a downstream side of the scraper blade 22 by being fixed to a downstream side of blade mount 18 preferably using the same bolts 34 used to secure the scraper blade to the blade mount member so that the existing modular cleaning unit 26 need not be reconfigured for mounting of the wear monitoring unit 100 thereto. Thus, when the nuts 36 are tightened down on the projecting end portions 35 of the threaded shanks of the bolts 34, the upturned end portion 19 of the blade mount member 18 is clamped between the main blade body 38 of the scraper blade 22 and the housing 102 of the wear monitoring unit 100. Due to the downstream mounting location of the wear monitoring unit 100, the wear monitoring unit 100 is substantially protected from the material scraped from the belt 20 by the scraper blade 22. The housing 102 has a width in the lateral direction orthogonal to the downstream travel direction 24 approximately equal to the width of the scraper blade 22 and includes an upper wear portion 106 having an upper edge 107 vertically aligned with the uppermost extent of the scraper blade tip 40 to be flush therewith and configured to be worn down along with the scraper blade tip 40 due to abrasion caused by contact with the conveyor belt 20. The housing 102 may be of a molded plastic material or other material that is resistant to abrasion but softer than the scraper blade 22 and blade tip 40 such that the upper wear portion 106 and the associated wear sensor circuit board 108 attached thereto will wear down along with the scraper blade 22 and tip 40. As shown in FIG. 3, the downstream side of the housing 102 has a ribbed construction with a plurality of spaced-apart, laterally extending ribs, as well as a plurality of spaced-apart vertically extending ribs and a plurality of oblique ribs extending obliquely with respect to the horizontal and vertical ribs. Such a ribbed construction provides the housing 102 with increased rigidity. The material of the housing 102, or at least a portion thereof, may be transparent or translucent to allow an internal light source, such as an LED 144 mounted to control circuit board 110 configured to indicate an operating status of the wear monitoring unit 100, to be visible to a user through the housing 102 when the light source is illuminated. A pair of spaced apart through holes 104 in the housing 102 are positioned below the upper wear portion 106 for receiving blade mounting fasteners, such as shanks of bolts 34. The housing 102 is mounted to a downstream side of the blade mount 18 with corresponding nuts 36 on the bolt shanks, with an upstream side of the housing 102 in engagement with a downstream side of the scraper blade 22.

Figure 5:
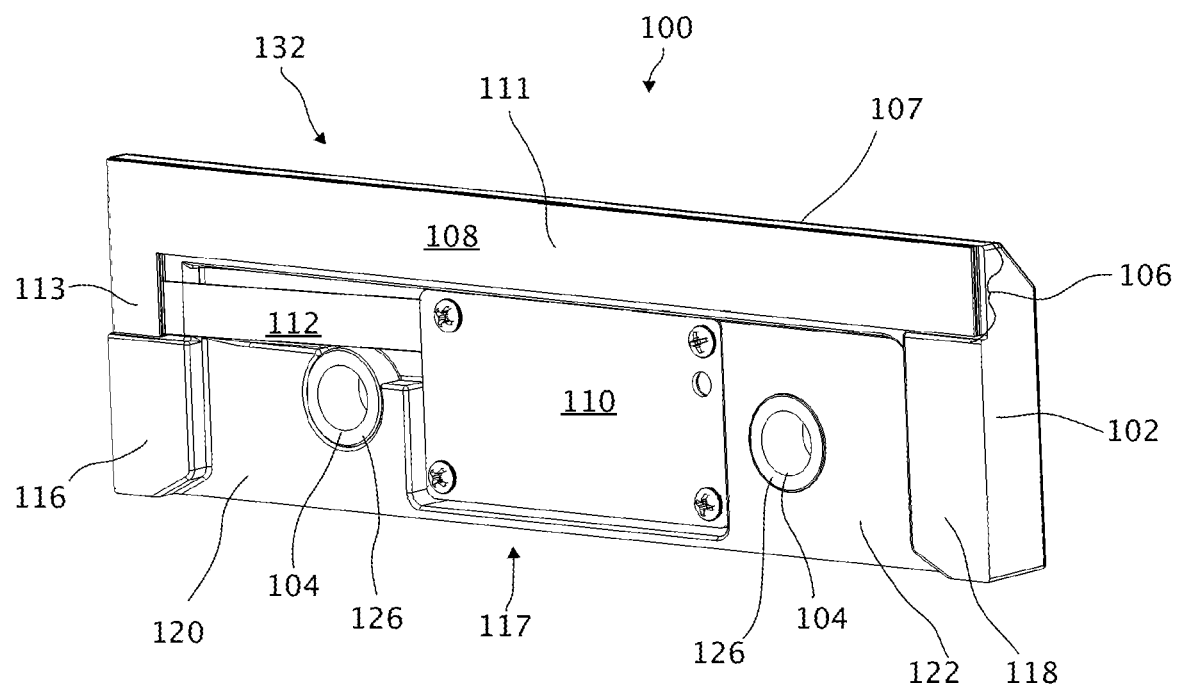
FIG. 5 is a perspective view of the upstream side of the wear monitoring unit shown in FIGS. 2-4 including a wear sensor assembly including a wear sensor circuit board and the wear monitoring control circuit board.
Figure 6:
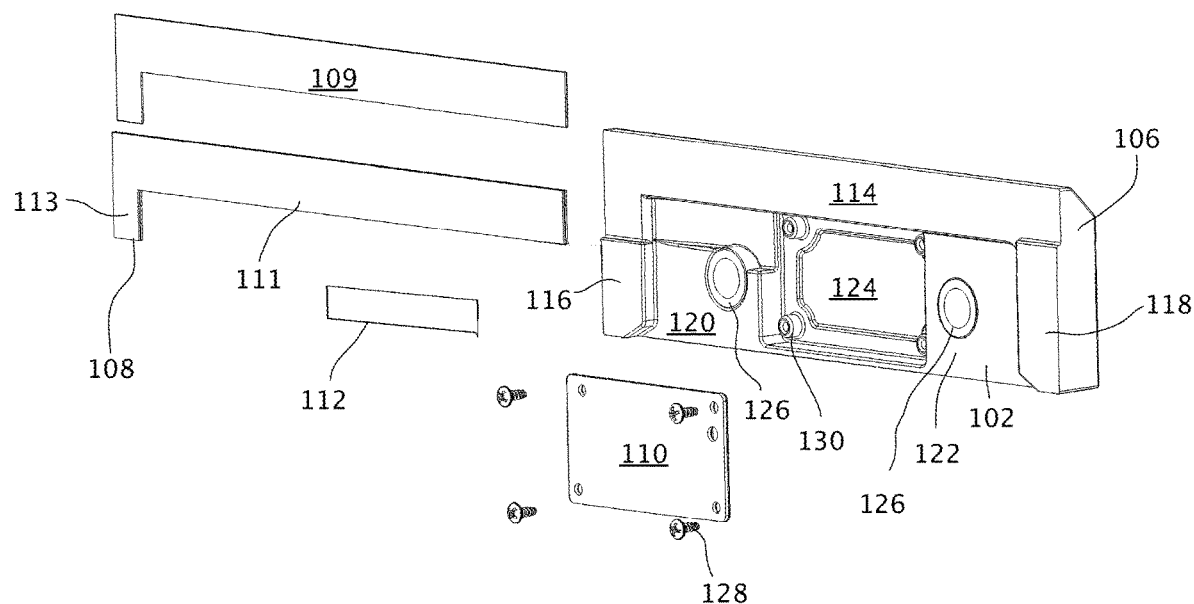
FIG. 6 is an exploded perspective view of the wear monitoring unit shown in FIGS. 2-5 showing components thereof including the wear monitoring unit housing, the wear sensor circuit board, adhesive tape for mounting the wear sensor circuit board to the housing, the wear monitoring control circuit board, and a ribbon connector for connecting the wear sensor circuit board and the wear monitoring control circuit board.

Now referring to FIGS. 5 and 6, the wear monitoring unit 100 includes a wear sensor 132 positioned on a wear sensor circuit board 108. A control circuit board 110 for processing signals from the wear sensor circuit board 108 and communicating with remote devices is electrically interconnected to the wear sensor circuit board 108 via a ribbon connector 112. The wear sensor circuit board 108 is attached, such as via an adhesive tape 109, to internal wear sensor mounting surface 114 formed on the upstream side of the upper wear portion 106 of housing 102, which is sized and configured to have the same or substantially the same shape as the wear sensor circuit board 108. As shown, the wear sensor circuit board 108 has an "L" shape with an elongate leg portion 111 that extends laterally across the top portion of the housing 102 adjacent to the upper wear portion 106 thereof. At one end of the leg portion 111, smaller foot portion 113 of the wear sensor circuit board 108 extends down along one side of the housing 102.

Figure 4:
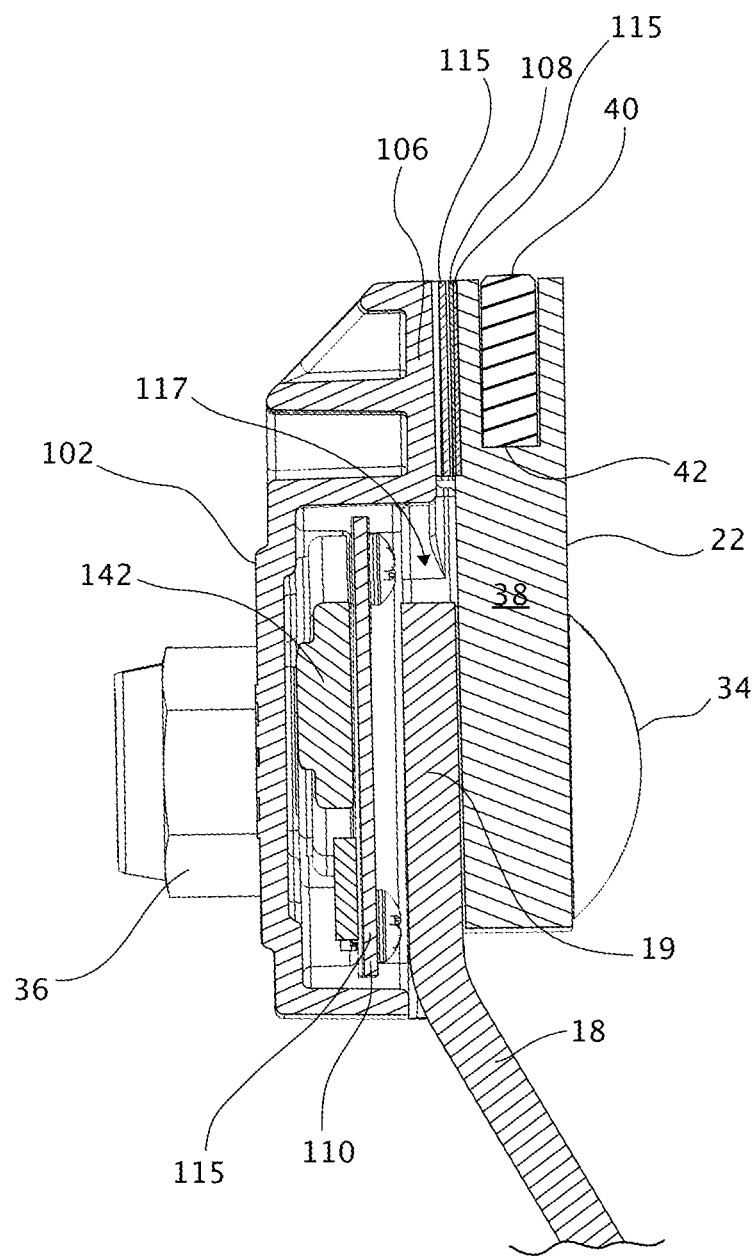
FIG. 4 is a cross-sectional view of the scraper blade and the wear monitoring unit taken along line 4-4 in FIG. 2 showing the wear monitoring control circuit board disposed in a protected pocket between the wear monitoring unit housing, the scraper blade, and the angled spring plate member.

The wear sensor mounting surface 114 also can have an "L" shape and is recessed with respect to vertically extending side surfaces 116 and 118 of the housing 102 that face upstream and engage the downstream facing side of the blade body 38 such that the wear sensor circuit board 108 will fit between the wear sensor mounting surface 114 and the downstream side of the scraper blade 22 with the upstream side of the wear sensor circuit board 108 and the vertically extending side surfaces 116 and 118 in engagement with, and preferably adhesively affixed to, the downstream side of the scraper blade 22. Between the vertically extending side surfaces 116, 118, the housing 102 includes laterally opposed mounting surfaces 120 and 122 on either side of a recessed control circuit mounting cavity 124 for mounting the wear monitoring unit 100 to the blade mount member 18. The mounting surfaces 120, 122 are recessed with respect to the vertically extending side surfaces 116, 118 to form a slot opening 117 between the scraper blade 22 and the housing 102 that faces downwardly and in which upturned end portion 19 of the blade mount 18 is received, as shown in FIG. 4. With blade mount upturned end portion 19 inserted in the slot opening 117, the vertically extending side surfaces 116, 118 are aligned along the lateral edges of the of the blade mount 18. A pair of bearing or sleeve inserts 126 are positioned in the through-openings 104 in the mounting surfaces 120, 122 for receiving bolts 34 for mounting the wear monitoring unit 100 to the blade mount 18. The control circuit mounting cavity 124 is further recessed in the downstream direction 24 than the mounting surfaces 120, 122 and also the wear sensor mounting surface 114 to form a protective pocket in which the control circuit board 110 is mounted to the housing 102 downstream from the blade mount 18, as well as wear sensor circuit board 108, as seen in FIGS. 4 and 5. The control circuit board 110 is mounted to the housing 102 via four threaded fasteners 128 that are received in corresponding bosses 130 formed in the control circuit mounting cavity 124 of the housing 102. The control circuit board 110 is mounted with its protruding circuit components facing downstream such that they are protected from contact with the blade mount 18. A potting material is preferably provided surrounding the control circuit board 110 within the control circuit mounting cavity 124 to protect the electrical components from liquids, dust and debris.

The wear monitoring unit 100 advantageously may be provided as a retrofit unit that is self-contained such that it may be connected to an existing scraper blade 22 and/or scraper blade mount member 18 in the field without modification to the scraper blade 22 or scraper blade mount member 18. An adhesive may also be used to more firmly attach at least the upper wear portion 106 of the wear monitoring unit 100 to the downstream side of the scraper blade 22 to inhibit the ingress of dust, debris, or liquids into or onto electrical components or circuitry of the wear monitoring unit 100. In another form, the wear monitoring unit 100 may be pre-attached to the scraper blade 22 and/or blade mount member 18 prior to its use. A single wear monitoring unit 100 may be mounted to a single scraper blade 22 of a belt cleaner system 10 to monitor the wear of that scraper blade 22, which may or may not be representative of the wear experienced by each scraper blade 22 of the belt cleaner system 10. If known, a user can mount the wear monitoring unit 100 to the scraper blade 22 that wears down the fastest. Alternatively, multiple wear monitoring units 100 may be used to track the wear of multiple scraper blades 22 of a single belt cleaner system 10, such as scraper blades 22 located on either lateral side and/or the center of the belt cleaner system 10. This way, if scraper blades 22 on one side of the belt cleaner system 10 wear faster than the other side, the wear monitoring unit 100 on the more worn side will notify an operator accordingly and allow more timely replacement of such worn blades 22.

Figure 7:
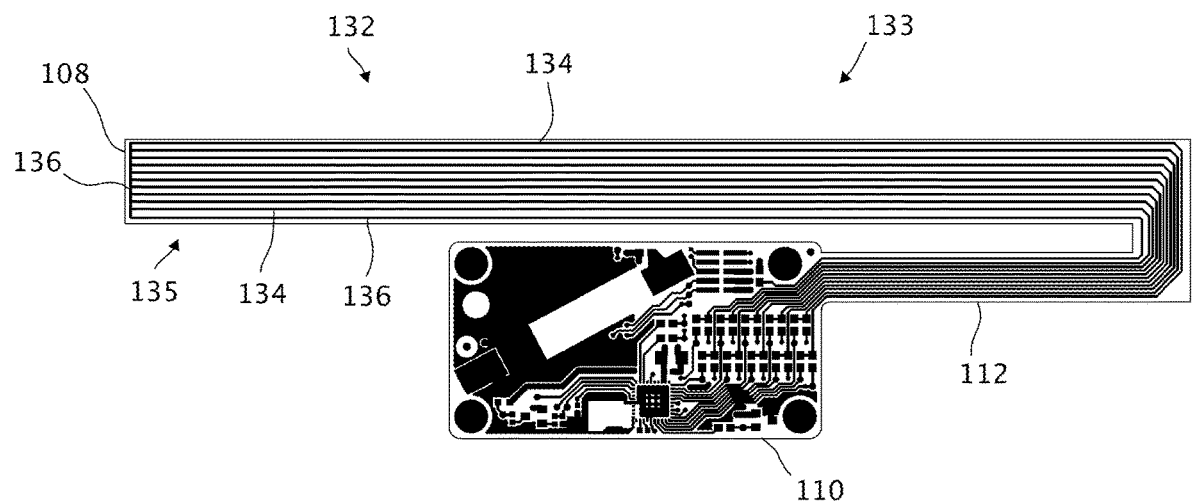
FIG. 7 is a front elevational view of the conductive layer of the wear monitoring sensor of the wear monitoring unit shown in FIGS. 2-6 showing a plurality of conductive wear indicator loop circuits formed by conductive lines which extend from the wear sensor circuit board to the wear monitoring control circuit board via the ribbon connector.

FIG. 7 shows a conductive layer 133 of the wear sensor circuit board 108, control circuit board 110 and ribbon connector 112 of the wear monitoring unit 100. The wear sensor circuit board 108 includes a wear sensor 132, which is formed by a series of vertically spaced-apart conductive lines 134 each connected by a vertical portion of common connector line 136, which together form a series of conductive wear indicator loops 135. In the embodiment shown, ten conductive lines 134 are provided, which are evenly spaced apart by 0.5 mm, although other spacings and number of conductive lines 134 are contemplated. The vertical spacing between each conductive line 134 corresponds to approximately 10% of the height of the scraper blade carbide tip 40. Each of the conductive lines 134 extends laterally along the length of the leg portion 111 of the L-shaped wear sensor circuit board 108 from the vertically extending portion of common connector line 136 to the opposite side of the wear sensor circuit board 108, then continue down to the bottom of the foot portion 113 of the wear sensor circuit board 108 and laterally back along the ribbon connector 112 and onto the control circuit board 110, where each conductive line 134 is connected with processing circuitry, such as processor 138.

The wear sensor circuit board 108, ribbon connector 112, and control circuit board 110 may comprise a common flexible circuit, including conductive layer 133 and additional conductive and non-conductive layers. The flexible circuit may be formed of flexible materials such as polyimide or polyester films. The wear sensor circuit board 108 and the control circuit board 110 may also include one or more rigid layers 115, such as FR-4 or a woven glass-fiber laminate impregnated with epoxy, to provide stiffness. The wear sensor circuit board 108 preferably includes rigid layers 115 on both upstream and downstream sides thereof to provide additional stiffness to the wear sensor 132, as shown in FIG. 4. The conductive lines 134 may be deposited by known methods, such as conductive ink printing. Various other materials may also be used for constructing the wear sensor 132, including the wear sensor circuit board 108, so long as they are configured to wear the same as, or more easily than, the scraper blade tip 40, which may be of a metallic material such as tungsten carbide. Such materials may include polyimide, Teflon, liquid crystal polymer, polyester, polyethylene naphthalate, ceramic, copper, nickel, gold, tin, lead and silver.

The processor 138 is configured to check for continuity of each of the conductive wear indicator loops 135 formed by conductive lines 134 and connector line 136. As the scraper blade 22 (or 522 or 622) begins to wear down from its uppermost extent, the wear sensor circuit board 108, which has its uppermost edge aligned with the tip of the scraper blade 22, will also wear down to the same extent. The uppermost conductive line 134 will be worn away first, corresponding to approximately 10% of the scraper blade tip 40 being worn away. Accordingly, when the processor 138 initiates a conductivity check of the conductive loops 135, only 9 of 10 conductive loops 135 formed by conductive lines 134 will be detected, corresponding with a remaining amount of the scraper blade tip 40 of 90%. The remaining conductive lines 134 will be worn away sequentially from top to bottom. The processor 138 is configured to transmit a status signal via a communication module, such as a Bluetooth® communication module 140, which indicates an identifier or serial number of the wear monitoring unit 100, such as a unique 12-bit alphanumeric name, as well as the number of remaining conductive lines 134, e.g., 9/10, such as by appending bytes to the identification data transmitted by the communication module 140 that represent how many conductive lines 134 remain. Other information may also be appended to the identification data, such as a received signal strength indicator (RSSI), a sensed temperature, and a number of fast wake-ups experienced by the processor 138. The processor 138 may also be configured to cause the Bluetooth® communication module 140 to enter a pairing mode for pairing with and/or a broadcast mode for communicating with a corresponding communication module of another device, such as a mobile device 302 or a sensor module 400 of a conveyor monitoring system 300, as described in further detail below.

To conserve the life of the power source, i.e., battery 142, the processor 138 may be configured to alternate between a "sleep" state, which consumes very little power, and an active state, which can consume more power from the power source, and in which the processor 138 is operable to conduct its various functions. In the sleep state of the processor 138, the processor 138 includes a low power clock that will continue to operate. The processor 138 is operable to receive a signal from the clock while in the sleep state and cause the processor to wake and initiate its active state, which may occur at regular predetermined intervals, such as every thirty minutes, every hour, every 2-12 hours, every day, or every week. The processor 138 can cause the LED 144 to illuminate or flash to indicate to a user that the wear sensor 132 is in an active state. The processor 138 may be configured to remain in its active state for a predetermined period of time before returning to its sleep state, such as one minute, two minutes, five minutes, 10 minutes, 15 minutes, 30 minutes, 45 minutes, or one hour. For example, the processor 138 can be configured to awaken from its sleep state periodically and conduct a wear sensor 132 status check, conduct a pairing operation with the Bluetooth® communication module 140 to connect to any in-range devices, and broadcast the identification information of the wear monitoring unit 100, 500, 700 and/or status of the wear sensor 132 to a paired device. In other forms, it may be unnecessary to conduct a pairing operation, and the communication module 140 can simply broadcast the identification information. Such identification information may be broadcast periodically, such as every second, every 10 seconds, every 30 seconds, every minute, etc. The processor 138 may also be configured to calculate and transmit a wear rate of the wear sensor 132, based on the amount of run-time of the associated conveyor belt 20 between successive elimination of the conductive lines 134. Once the last conductive line 134 is worn away, the processor will no longer detect the existence of any of the conductive lines 134, indicating that the scraper blade tip 40 is completely worn and the scraper blade 22 including the tip 40 thereof needs to be replaced.

Figure 8:
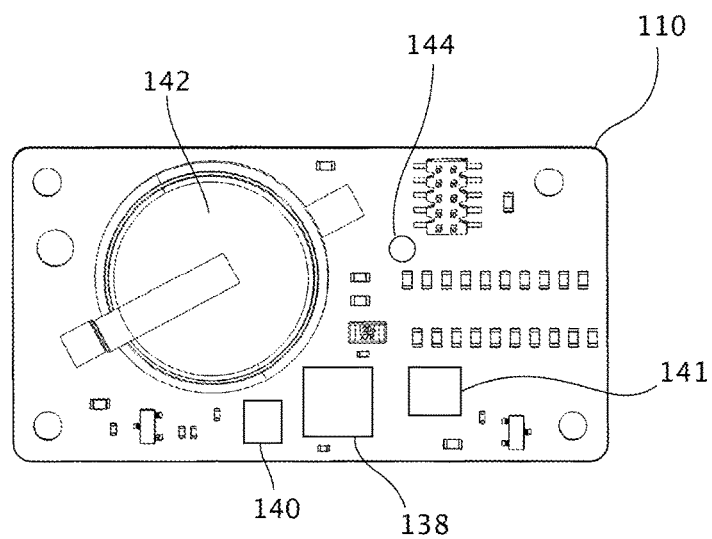
FIG. 8 is a front elevational view of the control circuit board showing components thereof, including a processor, a communication module, a battery, and an LED.

With reference to FIG. 8, the processor 138 may be configured to provide an indication of the status of the wear monitoring unit 100, 500, 700. For example, the processor 138 may transmit a signal via Bluetooth® communication module 140 that replacement of the scraper blade 22 is necessary or imminent as well as indicating other statuses of the wear monitoring unit 100, such as a low battery condition or malfunction of the wear sensor 132. The processor 138 may also provide visual status indications via LED 144 such as by flashing at predetermined intervals and/or by using a multiple LEDs 144 or a multicolored LED to indicate different statuses. The Bluetooth® communication module 140 may be configured to remain active at all times or to awaken periodically such as described above with respect to the processor 138 in order to communicate the status of the wear monitoring unit 100 with other devices, such as a smartphone 302 or a sensor module 400 mounted nearby to the wear monitoring unit 100, as described in more detail below.

In other forms, more or fewer conductive lines 134 may be used as desired. For example, four conductive lines 134 could be used to indicate when the scraper blade tip 40 is 25%, 50%, 75%, or 100% worn. Alternatively, nine conductive lines 134 could be used to indicate when the scraper blade tip 40 is 20%, 30%, 40%, 50%, 60%, 70%, 80%, 90%, and 100% worn, as implemented in the wear sensors disclosed in the embodiments of FIGS. 13-21. Even a single conductive line 134 could be used to form a single conductive loop 135 positioned on the wear sensor circuit board 108 to indicate a desired amount of wear when replacement of the scraper blade will soon be needed, such as 75%. In addition, instead of a Bluetooth® communication module 140, wear monitor unit 100 may include other wireless communication modules such as Bluetooth® Low Energy (BLE), WiFi, cellular, and Ultra-Wide-Band (UWB).

The wear monitoring unit 100 may be provided without any externally accessible buttons or switches in order to eliminate entry points for dust, debris, or liquids into the housing 102 of the wear monitoring unit 100. In one form, the processor 138 of the wear monitoring unit 100 may be activated from its sleep state by a remotely operated switch such as a magnetically-operated switch. Such a switch could be implemented by a Hall effect sensor (HES) 141. The HES 141 is operably connected to the processor 138 such that when the HES 141 is activated, such as by an operator manually placing one pole of an actuator magnet adjacent to the central portion of the downstream side of the housing 102 near the HES 141 on the control circuit board 110, the HES 141 transmits a signal to the processor 138 to cause the processor to awaken from its low power, sleep state and initiate its active state. In this manner, the wear monitoring unit 100 can advantageously be activated (or deactivated) on-demand by an operator without compromising the integrity of the hermetically sealed control circuit board 110 thereof. The processor 138 may also be configured to return to its sleep state by a signal transmitted from the HES 141 or after a predetermined period of time has elapsed after being activated via the HES 141. In another form, the HES 141 could be positioned in line with a contact of the battery 142 to activate or completely deactivate the wear sensor processor 138 on demand.

Figure 9:
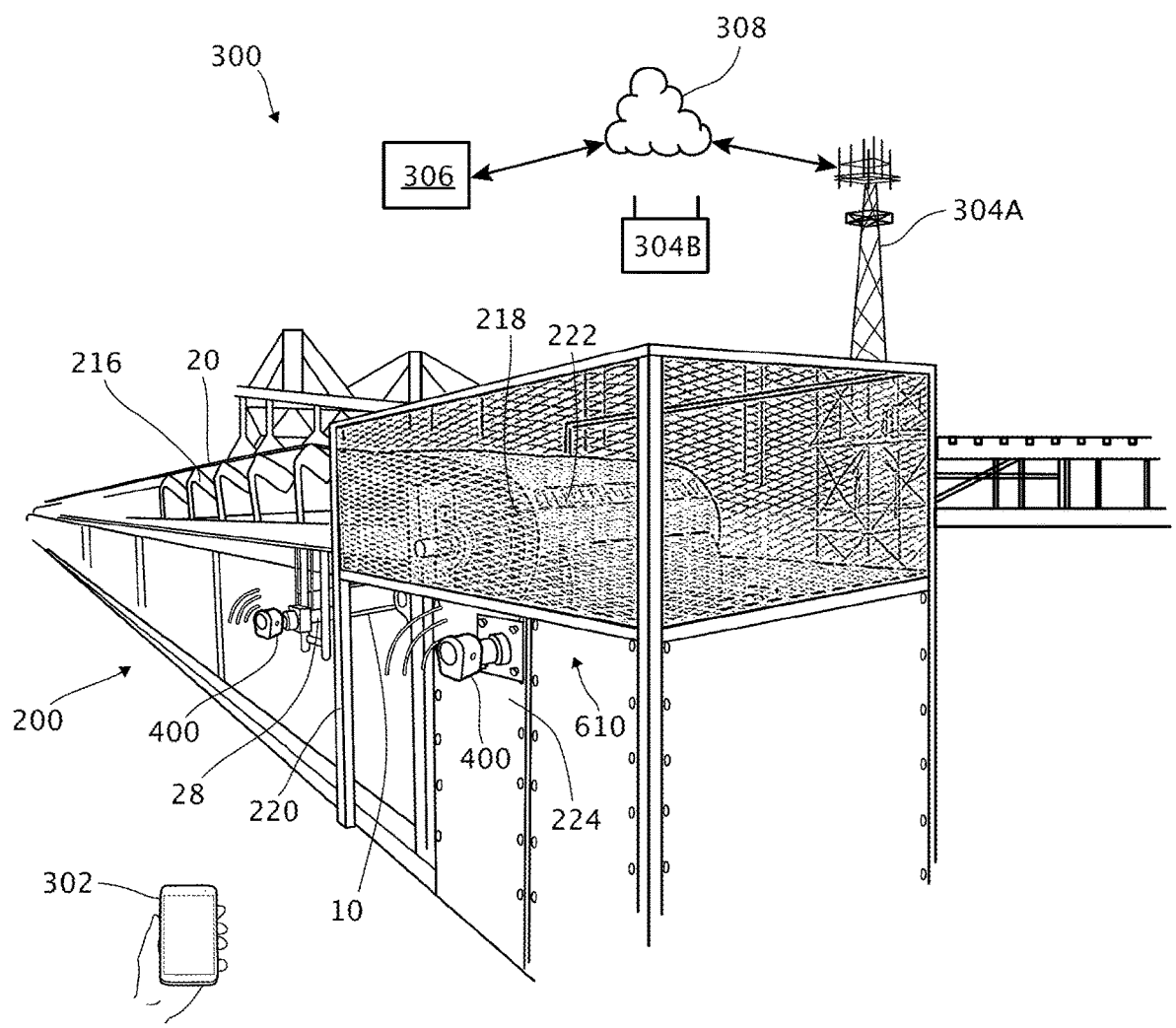
FIG. 9 is a perspective view of a conveyor belt system showing a primary and a secondary conveyor belt cleaner each having a sensor module associated therewith configured to transmit signals relating to properties of ancillary devices of the conveyor belt system, including wear of a scraper blade of the conveyor belt cleaner system transmitted to the associated sensor module by a wear monitoring unit of FIG. 2-8, 13-14, or 15-21.
Figure 13:
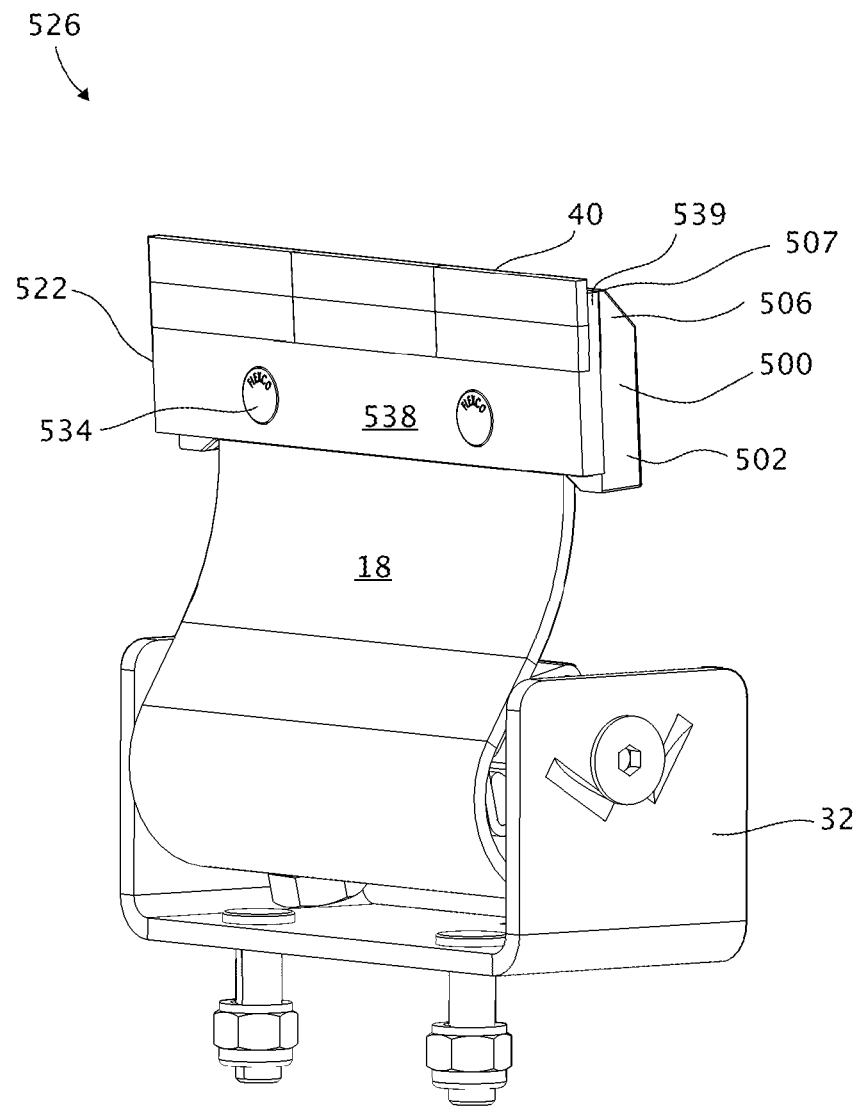
FIG. 13 is a perspective view of another modular cleaning unit for use with the belt cleaner system of FIG. 1 including a scraper blade and a wear monitoring unit attached to the downstream side of the scraper blade and a scraper blade mount.
Figure 14:
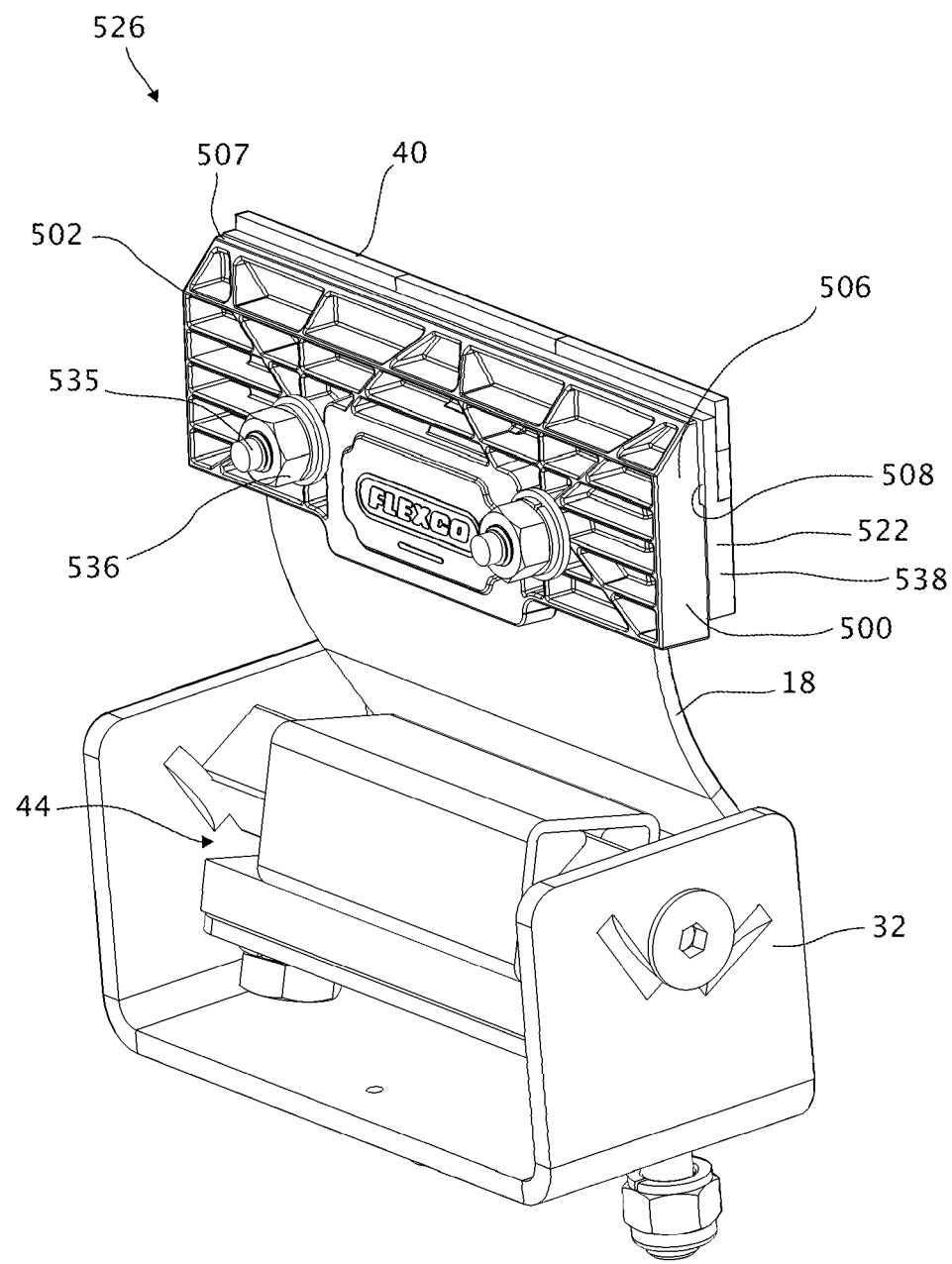
FIG. 14 is a perspective view of the modular cleaning unit of FIG. 13 showing the downstream side of a ribbed housing of the wear monitoring unit.

With reference to FIG. 9, a conveyor system 200 and a conveyor monitoring system 300 is shown that includes a conveyor belt 20 and a number of ancillary devices, such as a secondary belt cleaner 10. The conveyor system 200 can have a wear monitoring unit 100 or 500 as shown in FIGS. 13 and 14 and as described in more detail below. The conveyor system 200 can also include a primary belt cleaner 610 having one or more wear monitoring units 700 as shown in FIGS. 15-21 and as described in more detail below. The conveyor system 200 also includes idler rollers 216, drive rollers 218, and belt splice 222. The idler rollers 216 and drive rollers 218 of the system 200 are rotatably coupled to a stationary frame 220. The conveyor belt 20 is a continuous belt albeit containing a belt splice 222 or splices 222, extending around the idler rollers 216 and drive rollers 218 such that the conveyor belt 20 travels relative to the frame 220 along a path.

Figure 10:
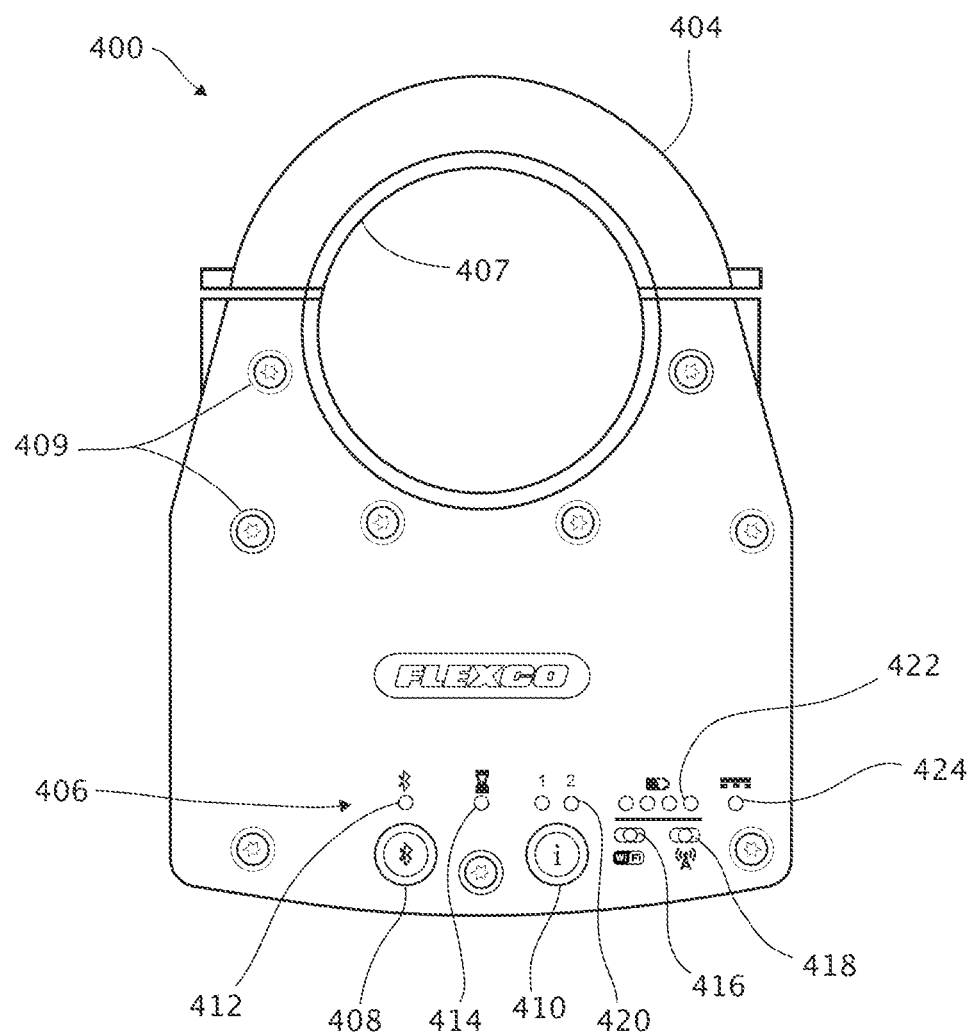
FIG. 10 is a front elevational view of the sensor module for being mounted to a support pole of the belt cleaner of a conveyor belt cleaner system to monitor one or more ancillary devices, including a scraper blade of the conveyor belt cleaner system via communication with the wear monitoring unit of FIG. 2-8, 13-14, or 15-21.
Figure 11:
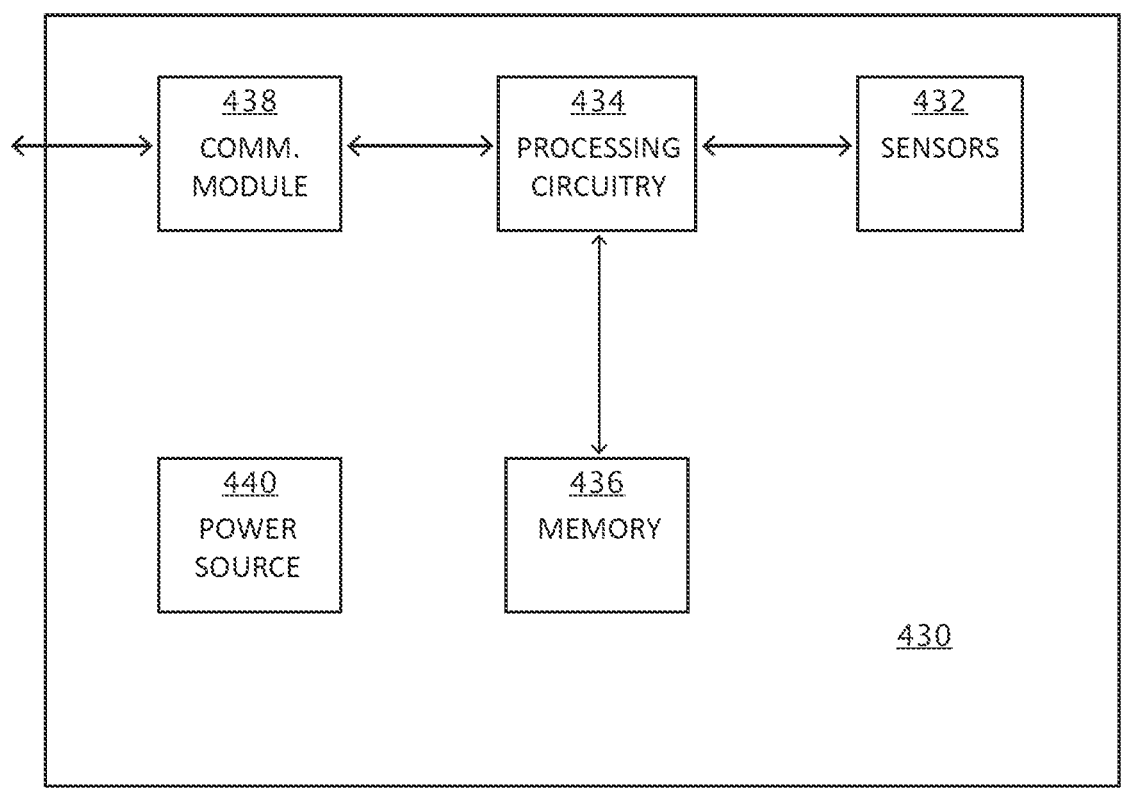
FIG. 11 is a block diagram of a sensor and control circuit of the sensor module of FIG. 10.
Figure 12:
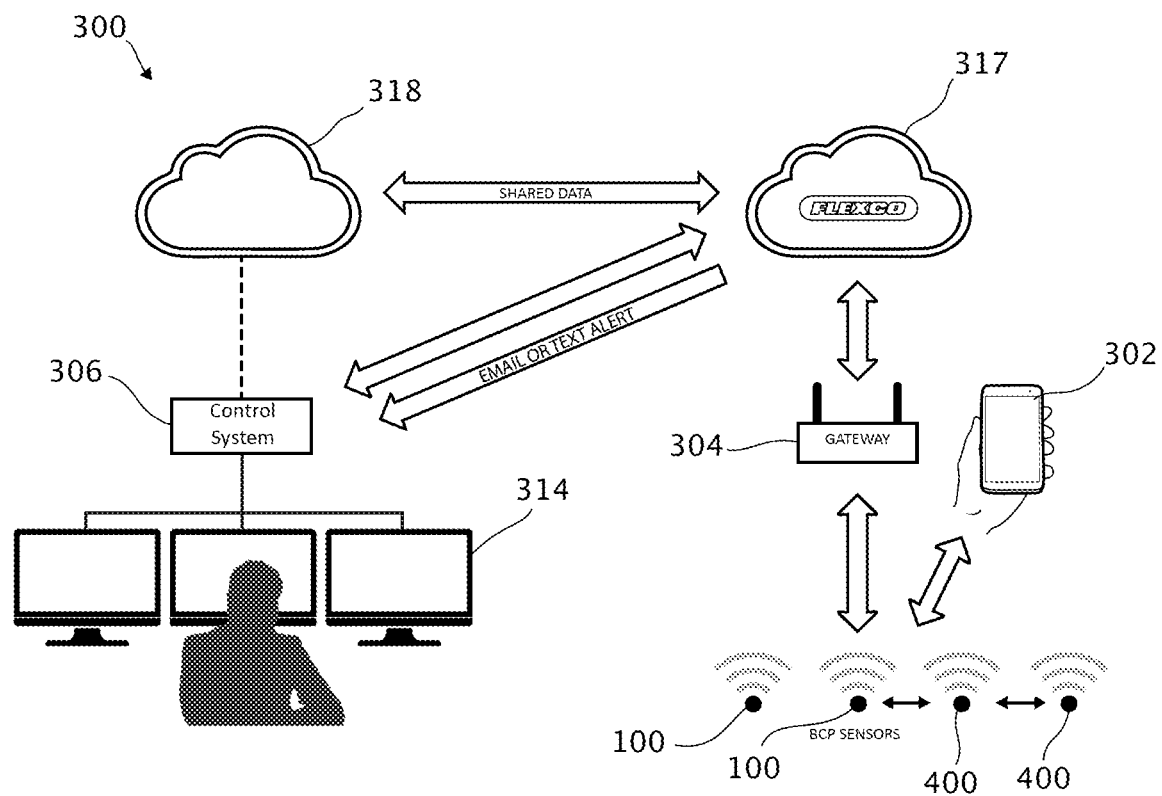
FIG. 12 is a network diagram illustrating the wireless communication of sensor modules including the scraper blade wear monitoring system and conveyor monitoring system by way of a wireless gateway and cloud storage as well as a second cloud computing system for providing additional parameters to a control system.

The wear monitoring unit 100, 500, 700 is configured to communicate its status wirelessly via its communication module 140 with other devices, such as a sensor module 400 of the conveyor monitoring system 300 shown in FIGS. 9-11, which may be the same as or similar to any of the sensor modules described in U.S. Pat. No. 10,836,585. The wear monitoring unit 100 may be configured to communicate with the closest sensor module 400, if multiple sensor modules 400 are within range. For example, the sensor module 400 may take the form shown in FIG. 10. The sensor module 400 is configured to detect one or more operating characteristics of an ancillary device of the conveyor system 200 which can be used for determining or predicting a property or condition of the conveyor system 200, such as the amount of scraper blade wear, which can also be reported by the wear monitoring unit 100, 500, 700 to the sensor module 400, and further transmit such information to a remote computer and/or user as shown in FIGS. 9 and 12.

The sensor module 400 has a housing 404 that may have separable, clamping portions to allow the housing 404 to be securely mounted about a support pole 28 of belt cleaner system 10 with the support pole extending through a through opening 407 formed by the housing 404. The separable portions of the housing 404 are coupled with screws 409 to fix the separable portions together clamped onto the pole 28. The housing 404 includes a user interface 406 having a plurality of user inputs, such as Bluetooth® pairing button 408 for pairing the sensor module 400 with, or otherwise configuring the sensor module 400 to receive broadcast information from, a Bluetooth®-enabled device, such as wear monitoring unit 100, 500, 700 or smartphone 302, status input button 410, which causes status indicators, such as pairing indicator 412, connection indicator 414, WiFi indicator 416, cellular indicator 418, status indicators 420, battery life indicator 422, and/or wired power source indicator 424 to illuminate.

The housing 404 of sensor module 400 encloses sensor module circuitry 430 schematically illustrated in FIG. 11. The sensor module circuitry 430 may include one or more sensors 432, such as an accelerometer, gyroscope, and magnetometer, which may be used to detect movement of an ancillary device, such as belt cleaner system 10, and specifically vibrations of the pole 28 or the belt cleaner 10. Processing circuitry 434 includes a processor communicatively coupled to the sensors 432, a memory module 436, and a communication module 438, such as one of the communication modules described in more detail below. The memory module 436 is a non-transitory computer readable memory, such as random-access memory (RAM), solid state memory, or magnetic disc-based memory. Data from the sensors 432 is transmitted to the processing circuitry 434, which writes the received data to the memory module 436. The processing circuitry 434 also may operate the communication module 438 to wirelessly transmit data from the sensors 432 to an external computing device using one or more of the standards listed below. The communication module 438 may also receive data from other devices, such as wear monitoring unit 100, 500, 700 and send the data to other devices, such as a remote computing device 302, 306, 314, 317, 318. A power source 440, such as a direct wired connection or an on-board battery, powers the sensor module circuitry 430 including processing circuitry 434, memory module 436, communication module 438, and sensors 432.

The wear monitoring unit 100, 500, 700 may also be configured to communicate directly with a computing device, such as a smartphone 302, computer 314, or tablet, such as via Bluetooth®. The wear monitoring unit 100, 500, 700 may also include wired or wireless communication functionality for communicating with a gateway 304, such as cell tower 304A or router 304B, for communicating data to a cloud-based computing system, such as a control system 306, via a network 308 as depicted in FIG. 9. The network 308 may include one or more networks, such as a cellular phone network (e.g., 3G, 4G, 5G, etc.) and/or the internet.

Information derived from the wear monitoring unit 100, 500, 700 may be stored in a database of a control system 306 for monitoring the condition of the belt cleaner system 10, 610 including one or more scraper blades 22, 522, 622 thereof. For example, a digital twin of the scraper blade 22, 522, 622 may be stored in a database of the control system 306, which may include various information such as a serial number, historical information such as installation date and age of the scraper blade 22, 522, 622 or wear monitoring unit 100, 500, 700 information regarding the health or condition of the scraper blade 22, 522, 622 such as the most recent wear reading received, the wear rate experienced by the wear monitoring unit 100, a distance that the belt 20 has traveled or length of time the belt 20 has been running with the scraper blade 22, 522, 622 in engagement with the belt 20, images of the scraper blades 22 of the belt cleaner system 10, user-entered comments, fault indications, actual inspection, repair, or replacement dates, as well as predictive information such as recommended inspection, repair, or replacement dates.

A user may record an image of the belt cleaner system 10, 610 and associated scraper blades 22, 522, 622 using a mobile computing device, such as a smartphone 302 or tablet, and associate and store the image with the stored record of one or more scraper blades 22, 522, 622 in the cloud computing system, such as control system 306, via application software so that the condition of the belt cleaner system 10, 610 may be monitored and accessed at any time by a computer 314, tablet, or a smartphone 302 in communication with a conveyor monitoring system 300, such as that disclosed in U.S. Pat. No. 10,836,585 (see also FIGS. 9 and 12). The conveyor monitoring system 300 may prompt a user via an e-mail, SMS message, or application notification to inspect and/or upload a new image of the belt cleaner system 10, 610 and/or scraper blade 22, 522, 622 based on various factors, such as an advanced wear indication by the wear monitoring unit 100, 610 a detected potential fault condition issued by the wear monitoring unit 100, 610 the number of hours of operation of the conveyor belt 20, or a predetermined interval of time, such as 1 month, 3 months, 6 months, or 12 months. The application software may include fields for providing comments and observations made by a user regarding the belt cleaner system 10, 610 and/or scraper blade 22, 522, 622 for maintaining accurate historical data regarding the condition of the belt cleaner system 10, 610 and the scraper blade or blades 22, 522, 622 thereof.

As shown in FIG. 12, the conveyor system 200 includes the monitoring system 300 for monitoring one or more characteristics of one or more components of the conveyor system 200. The monitoring system 300 includes the sensor module 400 and the wear monitoring units 100, 500, 700 (also referred to herein as sensor modules) positioned at one or more components of the conveyor system 200, as has been previously described. The sensor modules 100, 400, 500, 700 each include one or more sensors and a communication module 438, such as the Bluetooth® communication module 140, or one of the various communication modules described in more detail below. The sensor modules 100, 400, 500, 700 are configured to detect one or more conditions of the one or more components based on, for example, amount of scraper blade wear in the case of wear monitoring unit 100, 500, 700 and movements or positions of components or portions thereof in the case of sensor module 400. In some forms, the sensor modules 100, 400, 500, 700 cooperate and communicate with one another to detect one or more conditions of one or more components of the conveyor system 200. The conveyor monitoring system 300 includes a remote resource, such as cloud computing system 317, that processes data from the sensor modules 100, 400, 500, 700 to determine one or more properties or conditions of the corresponding ancillary devices and/or conveyor belt 20 such as wear of the scraper blades 22, 522, 622 and/or to predict the remaining lifespan thereof. For example, the sensor module 400 may transmit scraper blade wear data received from wear monitoring unit 100, 500, 700 to cloud computing system 317, which the cloud computing system 317 uses to report the current wear amount of the scraper blade 22, 522, 622 to an operator, determine a wear rate of the scraper blade, as well as predict when replacement of one or more scraper blades 22, 522, 622 will be required. The cloud computing system 317 is operable to detect other statuses of the conveyor system 200, such as whether the belt 20 is running, how long the belt 20 has been running, how many times a splice 222 has traveled about the conveyor system, whether the belt 20 is mistracking, whether the ancillary device, such as the belt cleaner system 10, 610, is properly engaged with the belt 20, the amount of carryback, and the presence or absence of material on the belt 20. As is known, the cloud computing system 317 may include one or more remote servers providing cloud computing functionality.

The sensor modules 100, 400, 500, 700 may communicate with the cloud computing system 317 by way of gateway 304. In some forms, wear monitoring unit 100, 500, 700 communicates with another sensor module 400, which in turn may communicate with a third sensor module 400, or a smartphone 302 or computer 314, which then communicates with the gateway 304.

Alternatively, the sensor modules 100, 400, 500, 700 may be configured to communicate directly with a smartphone 302. The gateway 304 may be an internet router 304B or cellular tower 304A which connects the sensor modules 100, 400, 500, 700 to the internet. Information from the cloud computing system 317 is viewed by a user through a computing device such as computer 314 or smartphone 302. The computer 314 is part of a control system 306, such as a computer configured to provide an operator information for monitoring, operating, adjusting or controlling the conveyor system 200 by the operator. Although a desktop computer 314 and a smartphone 302 are shown in FIG. 12, other computing devices may be utilized such as a laptop computer, a tablet computer, a smartwatch, and augmented reality glasses.

Regarding FIG. 9, the gateway or communication hub 304 for the conveyor system 200 may be a wireless router 304B, which wirelessly communicates with the plurality of sensor module 400 and/or wear monitoring unit 100, 500, 700. The wireless communication between the sensor modules 100, 400, 500, 700 and gateway 304 may utilize any of a variety of communication protocols. For example, the sensor modules 100, 400, 500, 700 may use infrastructure protocols such as 6LowPAN, IPv4/Ipv6, RPL, QUIC, Aeron, uIP, DTLS, ROLL/RPL, NanoIP, CNN, and TSMP; identification protocols such as EPC, uCode, Ipv6, and URIs; communication/transport protocols such as Wifi, Bluetooth®, DigiMesh, ANT, NFC, WirelessHart, IEEE 802.15.4, Zigbee, EnOcean, WiMax, and LPWAN; discovery protocols such as Physical Web, mDNS, HyperCat, UpnP, and DNS-SD; Data protocols such as MQTT, MQTT-SN, Mosquitto, IMB MessageSight, STOMP, XMPP, XMPP-IoT, CoAP, AMQP, Websocket and Node; device management protocols such as TR-069 and OMA-DM; semantic JSON-LD and Web Thing Model; and/or multi-layer frame work protocols such as Alljoyn, IoTivity, Weave, and Homekit.

The monitoring system 300 may include a processor, and the measured data from one or more of the sensor modules 100, 400, 500, 700 and corresponding to a detected one or more characteristics is received by the processor. The processor or another remote processor or processors, such as in the cloud 317, may determine and identify fault conditions, such as a mistracking belt, a worn-out scraper blade 22, 522, 622 or broken ancillary device, in the conveyor system 200 based on the measured data. In one form, the processor that receives the measured data is a local processor directly connected to a sensor module 100, 400, 500, 700, and the processor that determines and identifies fault conditions or worn-out devices is part of the remote computing device 302, 306, 314, 317, 318. The remote processor can be part of a remote computing device 302, 306, 314, 317, 318 that receives the data from one or more sensor modules 100, 400, 500, 700 over a wired and/or wireless communication network.

In some forms, each sensor module 100, 400, 500, 700 communicates directly with a communication hub or gateway 304, such as a router 304B. In another form, the sensor modules 100, 400, 500, 700 form a mesh network, in which a first one of the sensor modules 100, 400, 500, 700 acts as a communication relay for a second one of the sensor modules 100, 400, 500, 700, the second one of the sensor modules 100, 400, 500, 700 acts as a communication relay for a third one of the sensor modules 100, 400, 500, 700, and so on. The ability of the sensor modules to operate as communication relays allows sensor modules that would have difficulty directly communicating with a communication hub of the system to still provide data to the processor. For example, the communication hub may be positioned at the beginning of an underground mine at the opening thereto. The first sensor module is closest to the communication hub while the second and third sensor modules are progressively farther into the mine. Although the second and third sensor modules may be unable to communicate directly with the communication hub due to interference from the rock of the mine, for example, data from the third sensor module may be relayed by the second sensor module to the first sensor module which in turn relays the information to the communication hub. Likewise, the data from the second sensor module may be relayed by the first sensor module to the communication hub. In other forms, one or more of the sensor modules include a cellular communication card, such as a Global System for Mobile Communications ("GSM") card and communicate via a cellular network.

In some forms, the gateway 304A, 304B communicates with an external data processing system, such as a cloud-based computing system including control system 306 as shown in FIG. 9. The cloud-based computing system may store communicated data and/or process the communicated data such as via algorithms used to analyze the data and relay data and information back to the gateway 304A, 304B or another computer system for further processing or storage. For example, the cloud-based computing system may include one or more data processing applications configured to run on a virtual machine in the cloud-based computing system and process the data communicated to the cloud-based computing system by the gateway 304. Alternatively or additionally, the gateway 304 transmits data from the sensor modules 100, 400, 500, 700 to one or more onsite computers such as a control room computer or portable computers, e.g., smartphones or tablets, carried by users of the conveyor system 200. The sensor modules 100, 400, 500, 700 may also transmit data directly to the one or more onsite computers using one or more communication protocols such as those listed above. Furthermore, the sensor modules 100, 400, 500, 700 may transmit data between each other or other sensors before communicating data to the one or more on-site computers, the gateway 304, and/or the cloud-based computing system. The gateway 304 may use the same protocols or different protocols when communicating with the cloud-based computing system, an on-site computer, or another external device.

In another form in the illustrated conveyor system 200 of FIG. 9, one or more of the sensor modules 100, 400, 500, 700 include communication modules 438, which may be cellular communication modules. The communication modules are configured to communicate over a standard cellular communication protocol, such as GSM. One or more of the sensor modules 100, 400, 500, 700 can communicate with the control system 306 over a network 308 by way of a cellular phone tower 304A. In some forms, the communication module is configured to communicate over a low-power wide-area network, such as LTE CAT-M1 or NB-IoT. The communication module includes a fallback communication protocol, such as 2G cellular communications.

The sensor modules 100, 400, 500, 700 may be configured to sense data continuously but only transmit a portion of the data in order to reduce the amount of data that needs to be processed. Alternatively, the wear monitoring unit 100, 500, 700 may be configured or programmed to determine the number of remaining conductive lines 134 at predetermined intervals, such as every minute, every half-hour, every hour, or every day and transmit the wear data to the sensor module 400, which then transmits the wear data to the cloud-based computing system for processing. The sensor module 400 may be operable to awaken at fixed intervals, such as every ten minutes, every thirty minutes, every hour, etc., in order to receive data from the wear monitoring unit 100. The sensor module 400 may also awaken in response to certain events, such as large impacts against the belt cleaner system 10, increasing the frequency at which the wear monitoring unit 100, 500, 700 and sensor module 400 are both operable to communicate with one another.

In one form, the wear monitoring unit 100, 500, 700 and sensor module 400 are configured to be synchronized with one another such that they are operable at the same time and such that the wear data transmitted by the wear monitoring unit 100, 500, 700 is received by the sensor module 400 at regular intervals, such as at least once a day, or at least once a week. Accordingly, the condition of the scraper blade 22, 522, 622 can be uploaded to the cloud computing system 317 at regular intervals or frequently enough to accurately track the condition of the scraper blade 22, 522, 622 which may typically last a few months to a year or more depending on a variety of conditions. Sampling data at a fixed interval allows system users to control their data costs. However, at times, additional samples may be utilized to confirm a fault condition, such as a worn-out blade 22, 522, 622 or a mistracking belt. In this case, the cloud-based computing system, such as control system 306, may temporarily increase the sampling or transmission rate of a particular sensor module 100, 400, 500, 700 in order to confirm a fault condition exists. Generally, the sampling rate of the sensor modules may be increased or decreased as desired for particular situations.

In another form shown in FIGS. 13 and 14, an alternate modular cleaning unit 526 configured for use in a belt cleaner system 10 is shown, which is similar in structure and function to the modular cleaning unit 26 shown in FIGS. 2 and 3 but includes some structural modifications to the scraper blade 522 and the wear monitoring unit 500. For example, the main blade body 538 omits an upstream extension (see FIG. 4) such that the upstream-facing side of the blade tips 40 are substantially co-planar with the upstream side of the main blade body 538 so as to form a generally flat upstream-facing surface and the downstream-facing side of the blade tips 40 are mounted, such as by brazing, to an upper extension portion 539 of the main blade body 538. The blade tips 40 are arranged vertically in two rows to increase the amount of wearable material and the durability of the scraper blade 522 and the upper row of blade tips 40 protrude above the upper extension portion 539 of the main blade body 538 such that the blade tips 40 are subject to wear before the main blade body 538 and the wear monitoring unit 500. The scraper blade 522 is fixed to an upstream side of the blade mount member 18 with bolts 34 in the same manner as scraper blade 22. The blade mount member 18 is similarly mounted to torsion bias mechanism 44 described above.

The wear monitoring unit 500 is structurally and functionally similar to wear monitoring unit 100 with a few exceptions as described below. The wear monitoring unit 500 similarly includes a housing 502 which is adapted to be connected to a downstream side of the scraper blade 522 by being fixed to a downstream side of blade mount 18 with a pair of bolts 534 such that the scraper blade 522 is held to the upstream sides of the blade mount 18 and the housing 502 when the corresponding nuts 536 are tightened on the projecting end portions 535 of the bolts 534. Like the modular cleaning unit 26, the wear monitoring unit 500 may be secured to the blade mount 18 using the same bolts 534 used to secure the scraper blade 522 to blade mount member 18 so that the existing modular cleaning unit 526 need not be reconfigured for mounting of the wear monitoring unit 500 thereto. In this manner, the wear monitoring unit 500 is adapted to be retrofit to existing modular cleaning units 526. The housing 502 includes an upper wear portion 506 having an upper edge 507 vertically aligned or flush with the top end of the main blade body 538 of the scraper blade 522.

Because at least a projecting portion of the blade tips 40 initially extend above the top end of the main blade body 538 and the upper edge 507 of the upper wear portion 506, the upper wear portion 506 and the wear sensor circuit board 508 are not immediately subject to wear when the scraper blade 522 is newly engaged with a running conveyor belt 20. Instead, unlike the embodiment of FIGS. 2-8, the wear sensor circuit board may not begin to wear such that the first conductive line 134 is broken until approximately 20% of the vertical height the blade tips 40 have worn away due to abrasion caused by contact with the conveyor belt 20. Of course, the wear monitoring unit 500 may be configured to first indicate a corresponding wear amount of the blade tips 40 by different amounts, such as 5%, 10%, 25%, 30%, 40%, 50%, or 75% by adjusting the positioning of the wear sensor circuit board 508 and/or the positioning of the conductive lines 134 relative to the upper extent of the blade tips 40.

Figure 15:
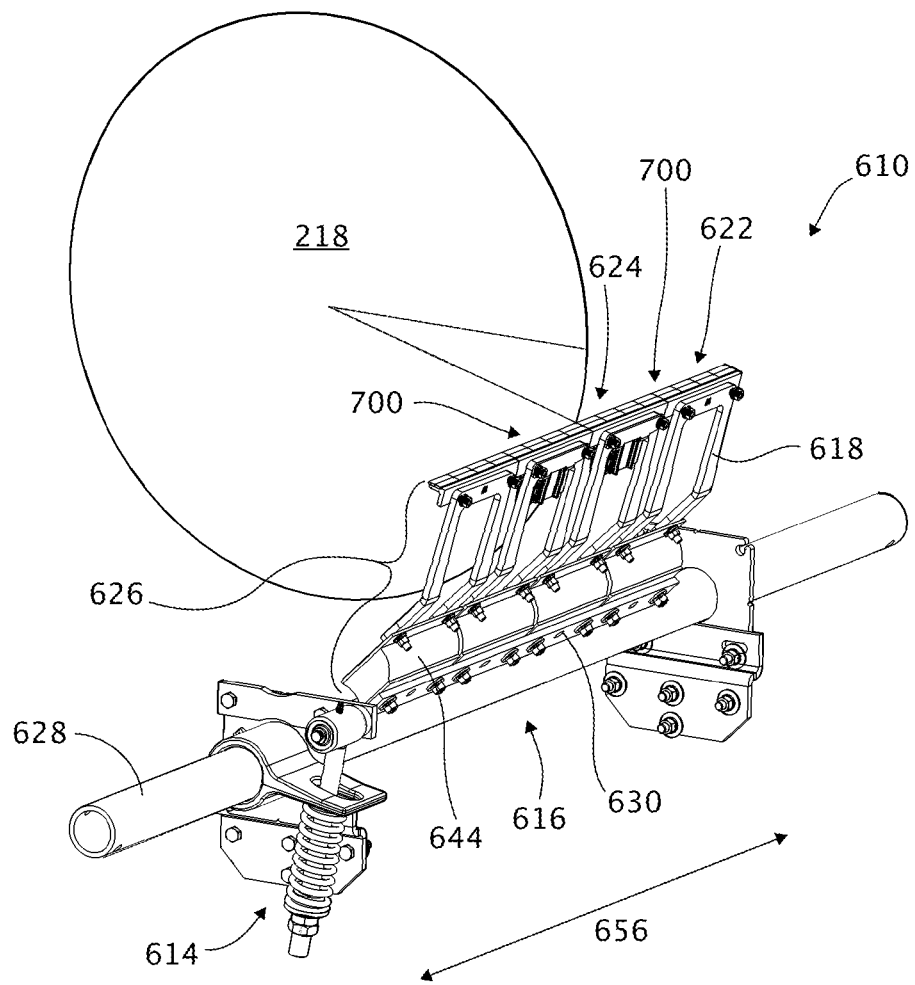
FIG. 15 is a perspective view of another exemplary belt cleaner system showing a plurality of cleaning blade assemblies operatively mounted to a support pole for being biased into engagement with a conveyor belt traveling about a head pulley with wear monitoring units mounted to the middle two cleaning blades.

In FIG. 15, another exemplary belt cleaner apparatus or system 610 including a plurality of modular cleaning units 626 is illustrated. In general, belt cleaner system 610 is designed for use as a primary belt cleaner which is positioned to scrape the belt (not shown) as it travels around a head pulley or drive roller 218, which in FIG. 15 is represented by a single circle but in actuality has a cylindrical configuration similar to the drive roller 218 shown in FIG. 9. The preferred orientation of the scraper blades 622 relative to the drive roller 218 for scraping the belt 20 is below where material transported on the belt 20 flows off of the belt, such as approximately 15-25 degrees below horizontal. The belt 20 travels in a radial travel direction 624 clockwise about the drive roller 218 as viewed in FIG. 15, and thus travels both vertically downward and in the return direction 24. Accordingly, as described in more detail below, the modular cleaning units 626 are configured differently from the modular cleaning units 26 and 526, which are generally intended to be engage the belt 20 along a return run of the belt 20 where the belt 20 spans between rollers such as between the head or tail rollers and an idler roller or between idler rollers and may be traveling generally horizontally as shown in FIG. 1. In view of the different orientation of the modular cleaning units 626, assemblies and components described as "inner" generally means they are relatively closer to or facing the belt 20 and "outer" generally means they are relatively further from or facing away from the belt 20, with the belt 20 traveling around the head pulley 218.

The belt cleaner system 610 similarly employs a plurality of scraper blades 622 arranged in a side-by-side orientation for extending across the width of the conveyor belt 20 to be cleaned so that the blades 622 are aligned in a lateral direction 656 transverse to the radial travel direction 624 of the belt 20. The scraper blades 622 are each attached to a suspension arm member 618 which resiliently keeps the blade 622 in engagement with the belt 20. The scraper blades 622 and suspension arm members 618 are each part of a modular cleaning unit 626 that are each mounted via a resilient cushion member or assembly 644 to an elongate support or support assembly 616 for supporting the modular cleaning units 626 with the scraper blades 622 in contact with the belt 20. The elongate support or support assembly 616 is mounted transversely to extend across the belt 20 adjacent to the drive roller 218 via opposing mounts, one or both of which may be resilient mounts such as spring tensioners 614, and may extend further such as to and through opposing chute walls 224 or a support frame 220 of the conveyor system 200 (see FIG. 9). The elongate support or support assembly 616 in the embodiment shown includes a pole member 628 to which an elongate cushion mounting bracket 630 is affixed. The modular cleaning units 626 are secured to the cushion mounting bracket 630 by bolting of the resilient cushion members or assemblies 644 thereto.

Figure 16:
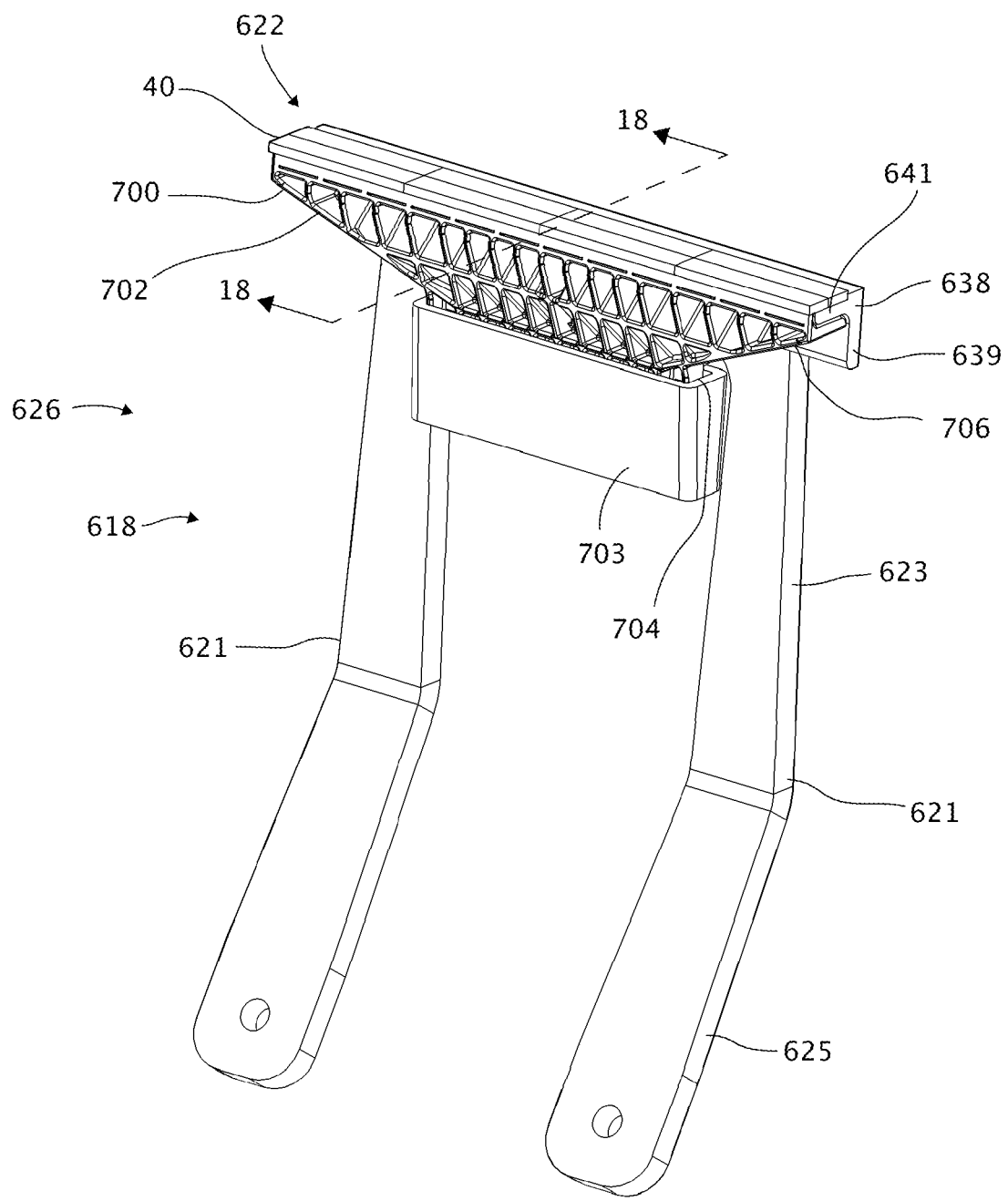
FIG. 16 is a perspective view of another modular cleaning unit for use with the belt cleaner system of FIG. 15 including a scraper blade and a wear monitoring unit attached to the downstream side of the scraper blade and a scraper blade mount, the scraper blade mount including a suspension arm member for resiliently keeping the scraper blade in engagement with the conveyor belt.
Figure 17:
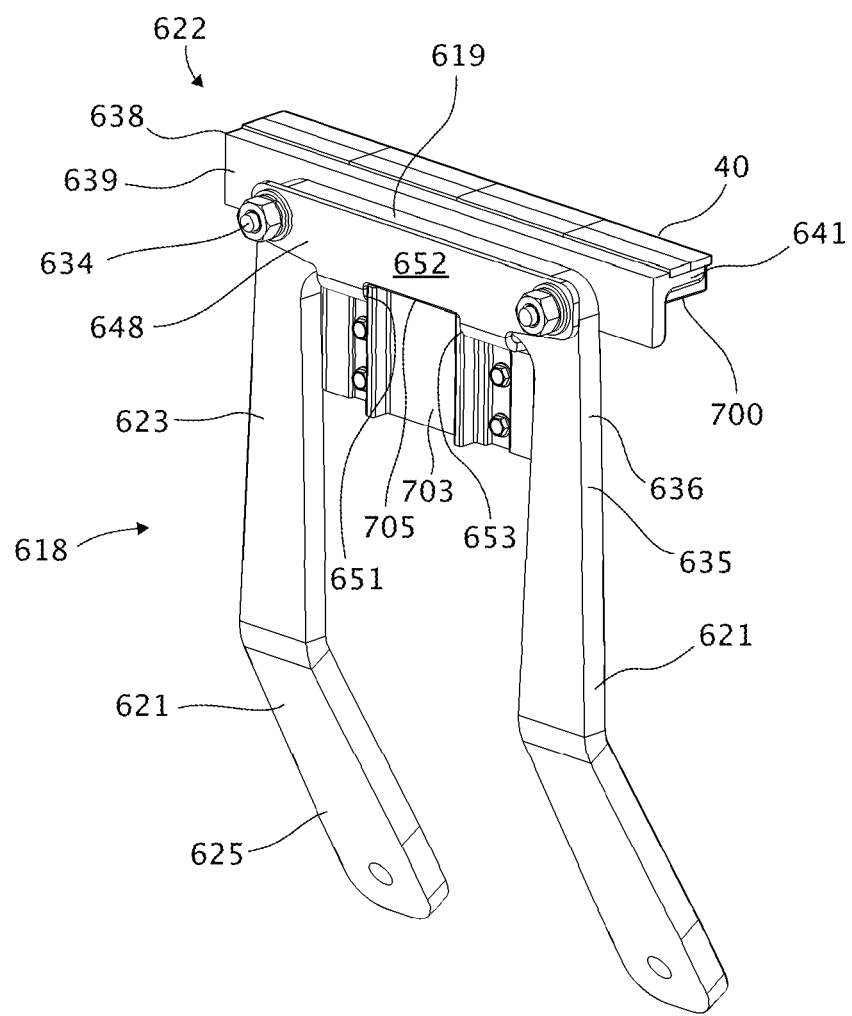
FIG. 17 is a perspective view of the modular cleaning unit of FIG. 16 showing the wear monitoring unit mounting bracket attached to an outer facing side of the upper blade mounting portion of the suspension arm member for attaching the wear monitoring unit thereto and the scraper blade attached to the inner belt-facing side of the upper blade mounting portion.

As shown in FIGS. 16 and 17, one of the modular cleaning units 626 is shown (with the cushion member or assembly 644 omitted) which includes a sensor module in the form of wear monitoring unit 700 that is preferably retrofittable onto the already existing modular cleaning unit 626 by being removably attached to a downstream side of the scraper blade 622 via a wear monitoring unit mounting bracket 648 that is mounted or secured to an outer side of suspension arm member 618. The suspension arm member 618 has an inverted U-shape when installed as shown in FIG. 15, with an upper blade mounting portion 619 and two opposite leg portions 621 extending from opposite end portions of the upper blade mounting portion 619. The upper blade mounting portion 619 includes spaced-apart apertures 627 for receiving fasteners 634 to attach the scraper blade 622 thereto. These same fasteners 634 can be used to attach the wear monitoring unit mounting bracket 648 to the upper blade mounting portion 619 via corresponding apertures 654 in the bracket 648 so that the existing modular cleaning unit 626 need not be reconfigured for mounting of the wear monitoring unit 700 thereto. Thus, when the nuts 636 are tightened down on the projecting end portions 635 of the threaded shanks 637 of the fasteners 634, the upper blade mounting portion 619 of the suspension arm member 618 is clamped between the bracket 648 and the scraper blade 622. The leg portions 621 include a bend between an upper portion 623, which is connected to the upper blade mounting portion 619, and a lower mounting portion 625, which is configured to be mounted to a cushion member or assembly 644 with fasteners. In this manner, as the bent leg portions 621 extend upwardly from the lower support pole member 628, they will generally follow the contour of the belt 20 as it travels circumferentially around the pulley 218. The suspension arm member 618 thereby allows the scraper blade 622 mounted thereto to contact the belt 20 at a desired orientation.

The scraper blade 622 includes a main blade body 638 formed from a metal angle bar, such as steel, having transverse leg portions 639, 641 that, as illustrated, extend from one another at a 90 degree angle. The upper leg portion 641 is configured for mounting the blade tips 40 thereto and the lower, depending leg portion 639 is configured for being mounted to the upper blade mounting portion 619 of the suspension arm member 618. A plurality of blade tips 40 of a harder material than the blade body 638, such as tungsten carbide, are fixedly mounted to a recessed mounting surface 643 of the upper leg portion 641 (see FIG. 19), such as by brazing. The blade tips 40 are mounted to the recessed mounting surface 643 in an array having two rows such that an innermost end portion (i.e. closest to the belt 20) of the innermost row of blade tips 40 project inwardly toward the belt 20 beyond a free inner end of the leg portion 641. The other leg portion 639 includes spaced apart apertures for being mounted to an inner-facing surface of the upper blade mounting portion 619 with the same fasteners 634 that mount the wear monitoring unit 700 to the scraper blade 622, as mentioned above and as shown in FIGS. 17-19.

As shown in FIGS. 16-19, the wear monitoring unit 700 includes a housing 702 which is adapted to be positioned at a downstream side of the scraper blade 622 via the wear monitoring unit mounting bracket 648, which is fixed to an outer side of suspension arm member 618 so as to clamp the upper blade mounting portion 619 thereof between the bracket 648 and the leg portion 639 of the scraper blade 622, as discussed above. Due to the downstream mounting location of the wear monitoring unit 700, the wear monitoring unit 700 is substantially protected from the material scraped from the belt 20 by the scraper blade 622. The housing 702 has an upper wear portion 706 having a width at its upper extent in the lateral direction 656 approximately equal to the width of the scraper blade 622. The upper wear portion 706 is generally sized and configured at its upper extent with a complementary shape to the downstream side of the main blade body 638 such that the upper wear portion 706 may closely abut thereagainst as described below. The upper wear portion 706 tapers down in the lateral direction 656 from its upper extent to a narrower lower portion 750 and has a ridged construction for strength and rigidity while minimizing the material used and its associated cost.

Figure 18:
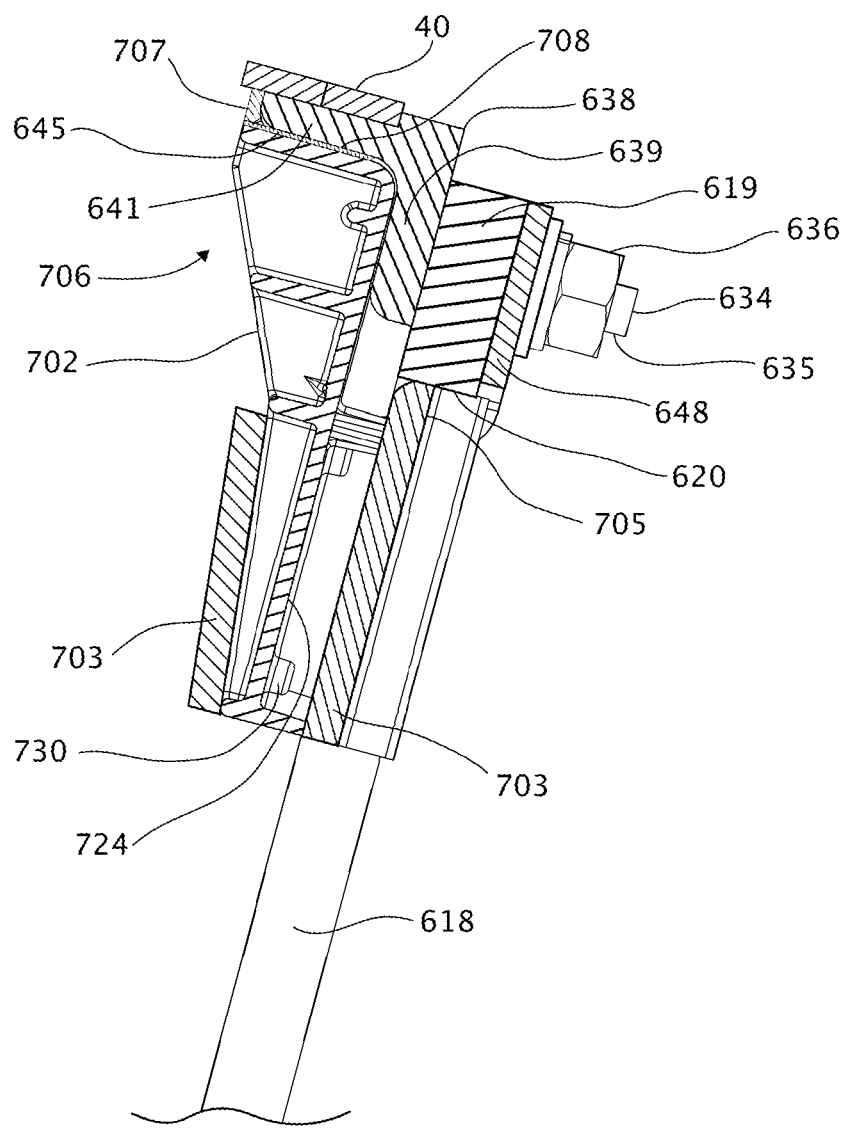
FIG. 18 is a cross-sectional view of the scraper blade and the wear monitoring unit taken along line 18-18 in FIG. 16 showing the protected pocket in the wear monitoring unit housing for the wear monitoring control circuit board formed by the wear monitoring unit housing, the scraper blade, and a protective sleeve member.
Figure 19:
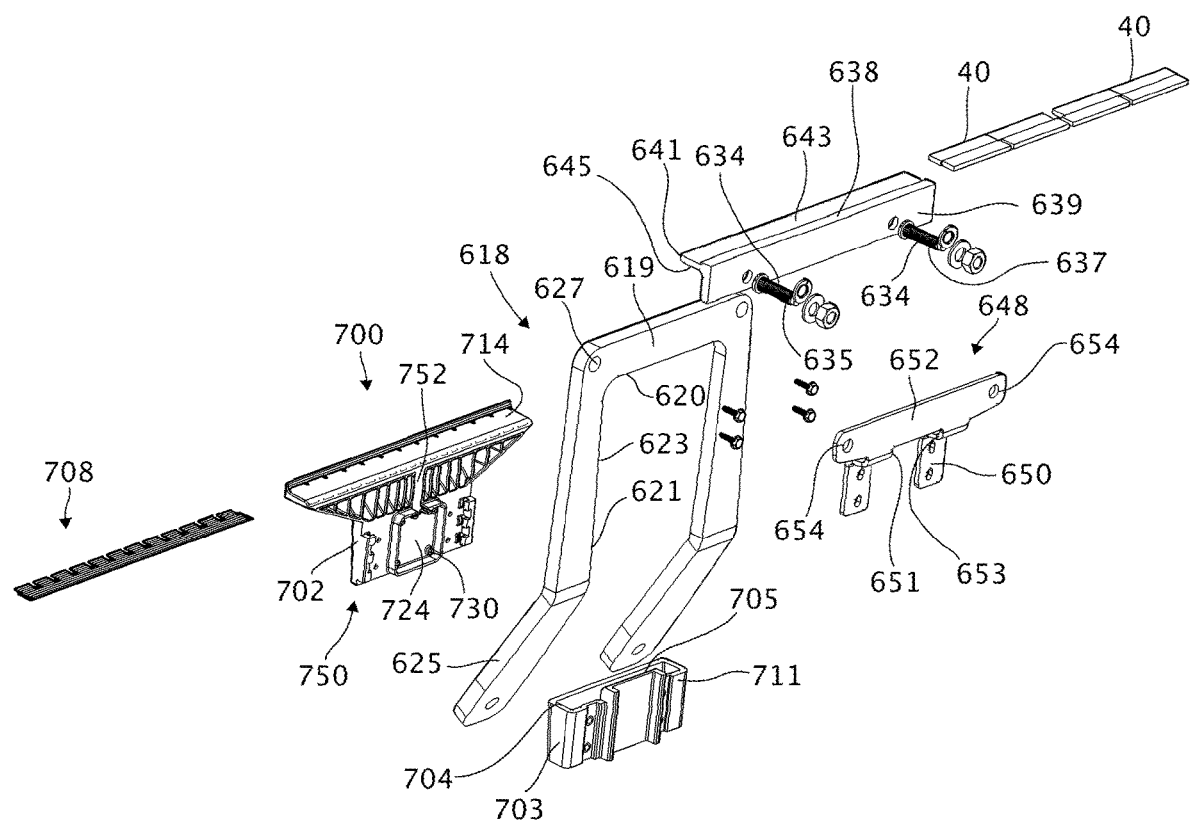
FIG. 19 is an exploded perspective view of the wear monitoring unit shown in FIGS. 16-18 showing components thereof including the wear monitoring unit housing, the wear sensor circuit board, the protective sleeve member, the wear monitoring unit mounting bracket, the scraper blade including carbide tips thereof, and the suspension arm member.
Figure 20:
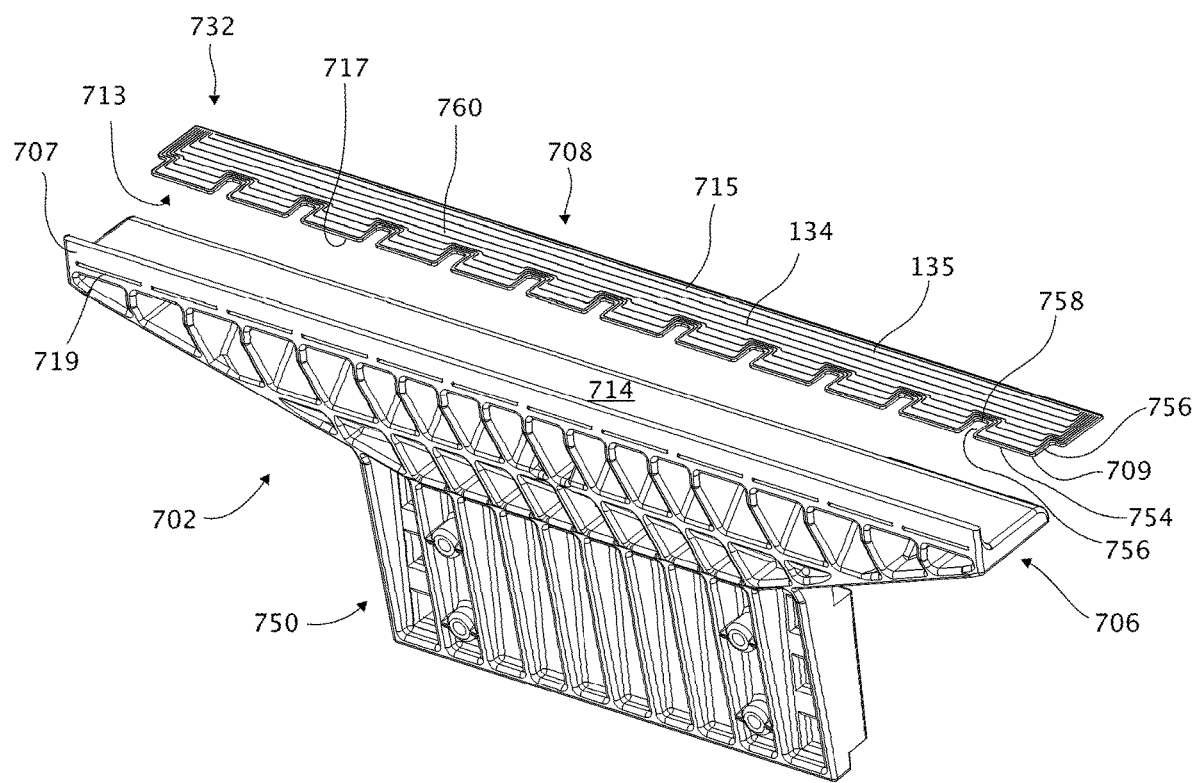
FIG. 20 is an exploded perspective view of the wear monitoring unit housing and the wear sensor circuit board showing a plurality of extension portions extending laterally from a long side of the wear sensor circuit and corresponding openings in a wear sensor mounting portion of the wear monitoring housing for receiving each of the wear sensor circuit board extension portions.
Figure 21:
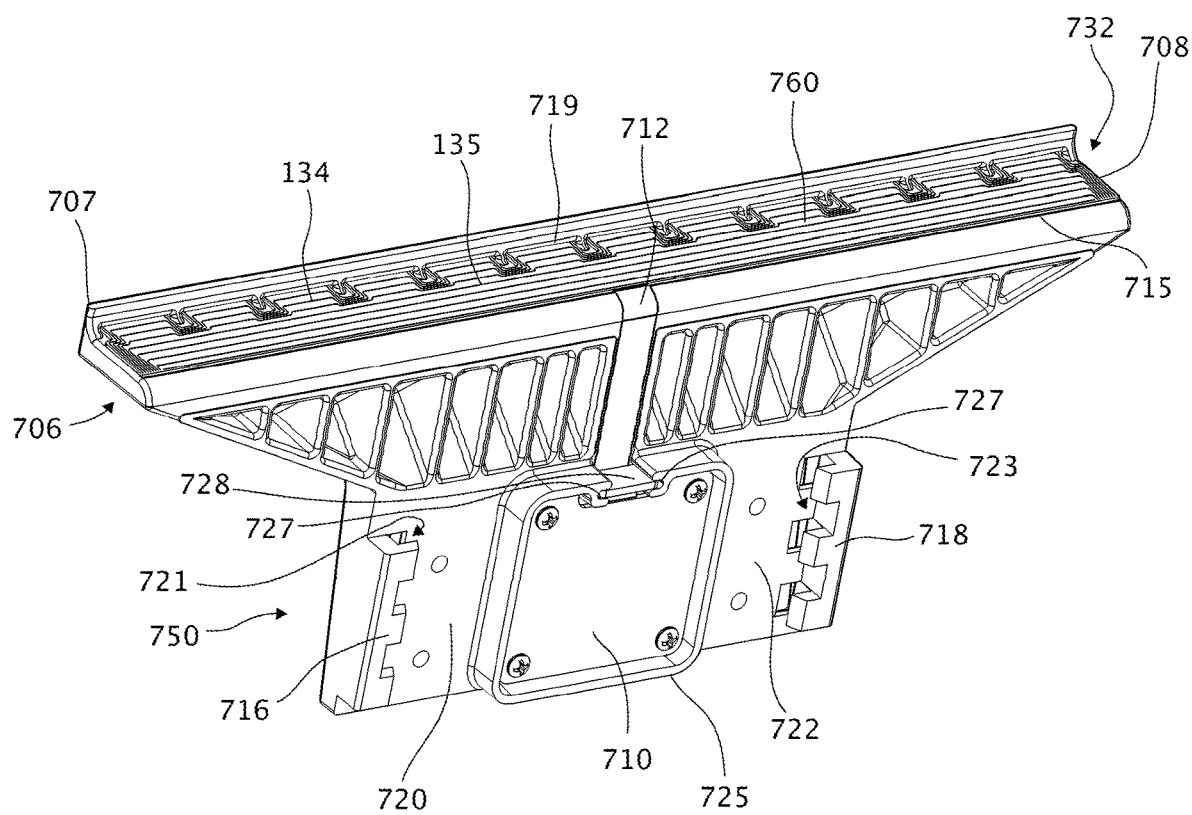
FIG. 21 is a perspective view of the wear monitoring unit housing and the wear sensor circuit board to show the wear sensor circuit board mounted to the wear monitoring unit housing with the plurality of extension portions extending through the corresponding openings of the wear monitoring housing.

The upper wear portion 706 is similarly configured to be worn down along with the scraper blade tips 40 due to abrasion caused by contact with the conveyor belt 20 as described above with respect to the embodiment of FIGS. 2-8. As shown in FIGS. 19 and 20, the upper wear portion 706 includes a generally flat wear sensor mounting surface 714 to which the wear sensor circuit board 708 is affixed, such as via an adhesive. Accordingly, the wear sensor circuit board 708 abuts the generally flat downstream facing surface 645 so that they are flush against one another as shown in FIG. 18. As shown in FIGS. 18, 20 and 21, a ridge portion 707 extends upwardly from an inner side edge of the wear sensor mounting surface 714. The ridge portion 707 extends along the length of the wear mounting surface 714 and the ridge portion is sized and configured to abut against a downstream side of the innermost blade tips 40 and the free end of the leg portion 641 of main blade body 638, which initially provides some protection to the wear sensor circuit board 708 from contaminants until the ridge portion 707 is worn away. The inner ridge portion 707 includes a plurality of equally spaced-apart elongate apertures 719 that are formed in part by the wear sensor mounting surface 714 and that allow a plurality of corresponding extension or tab portions 709 of the wear sensor circuit board 708 to extend into the elongate apertures 719 such that the extension portions 709 reside within the elongate apertures 719 for the purpose of allowing the wear sensor circuit board 708 to detect wear of the blade tips 40 sooner by positioning the conductive lines 734 of the wear indicator loops 735 closer to the inner edge of the blade tip members 40 that are in contact with the belt 20. The configuration of the inner ridge portion 707, elongate apertures 719 and the extension portions 709 also increases the ease of manufacturability. In particular, the inner ridge portion 707 and the elongate apertures 719 formed therein are locators for the wear sensor circuit board 708 by positively defining the appropriate position of the wear sensor circuit board 708 relative to the sensor mounting surface 714 with the extension portions 709 received in the elongate apertures 719.

As shown in FIGS. 20 and 21, the wear monitoring unit housing 702 includes a lower portion 750 that is narrower than the upper extent of the upper wear portion 706 and is sized such that it is narrower than the distance between the two opposing leg portions 621 of the suspension arm member 618. As shown in FIGS. 19 and 21, the lower portion 750 of the housing 702 includes a control circuit mounting cavity 724 formed by a generally rectangular wall 725 that extends thereabout. The rectangular wall 725 includes an opening or gap therein at an upper portion thereof to allow a ribbon connector 712, which is similarly configured as ribbon connector 112 and is connected to the wear sensor circuit board 708, to extend down along a central mounting surface 752 and through the opening to be connected with a control circuit board 710, which is similarly configured as control circuit board 110. A channel member 727 is formed on either side of the opening in the wall 725 to allow a gate or guillotine-like wall member 728 to be inserted into the channel members 727 down onto the ribbon connector 712 to allow the ribbon connector to extend thereunder while also enclosing the control circuit mounting cavity 724 to form a protective pocket in which the control circuit board 710 is mounted to the housing 702 downstream from the scraper blade 622, as well as wear sensor circuit board 708, as seen in FIGS. 18 and 21. The control circuit board 710 is mounted to the housing 702 via four threaded fasteners that are received in corresponding bosses 730 formed in the control circuit mounting cavity 724 of the housing 702. A potting material, such as a glass filled nylon material that optionally includes anti-static and flame resistant materials, is preferably provided surrounding and covering the control circuit board 110 within the control circuit mounting cavity 724 to protect the electrical components from liquids, dust and debris.

The housing 702 includes laterally opposed mounting surfaces 720 and 722 on either side of the control circuit mounting cavity 724 for mounting the wear monitoring unit 700 to the wear monitoring unit mounting bracket 648. The housing 702 further includes outwardly extending channel portions 716, 718 that extend along outer lateral edges of the laterally opposed mounting surfaces 720, 722, and which have a right angle or L-shaped cross-section to include an overhang portion so that each of the channel portions 716, 718 form a channel 721, 723 that is open towards the central control circuit mounting cavity 724 for receiving a lateral outer edge of one of a pair of depending, spaced leg portions 650 of the wear monitoring unit mounting bracket 648, as shown in FIGS. 19 and 21. Apertures are formed in the mounting surfaces 720, 722 for receiving fasteners for mounting or securing the leg portions 650 thereto with the leg portions 650 positioned between the outwardly extending channel portions 716, 718 and vertically extending portions of the wall 725, as best seen in FIGS. 17 and 19.

The wear monitoring unit mounting bracket 648 includes a laterally extending mounting portion 652 having a similar lateral size as upper blade mounting portion 619 of the suspension arm member 618 to which it is connected. The leg portions 650 are shaped such that they initially extend downwardly from a lower edge of the mounting portion 652 and include a pair of bends therein such that the leg portions 650 extend inwardly toward the belt 20 and then extend downwardly, such that the housing 702 connected thereto is positioned on the downstream side of the scraper blade 622 and on the inner side of the suspension arm member 618. The downwardly extending portions of the leg portions 650 include apertures for mounting the housing 702 thereto with fasteners.

The wear monitoring unit 700 is further protected from abrasion by a protective sleeve member 703, which is configured to cover the narrow lower portion 750 of the wear monitoring unit housing 702 to which the control circuit board 710 is mounted. The protective sleeve member 703 extends entirely about the lower portion 750 of the wear monitoring unit housing 702, which is received through an upper opening 704 formed by the annular sleeve member wall 711. As shown in FIGS. 17-19, an upper extension portion 705 extends above the upper opening 704 to abut against a lower surface 620 of the upper blade mounting portion 619 of the suspension arm member 618 and inner facing surfaces 651, 653 of the leg portions 650 of the wear monitoring unit mounting bracket 648 to inhibit entry of liquid, dust and debris between the sleeve member 703 and the wear monitoring unit housing 702. The protective sleeve member 703 is attached to the leg portions 650 of the wear monitoring unit mounting bracket 648 using the same fasteners 634 that are used to attach the wear monitoring unit 700.

Now referring to FIGS. 20 and 21, the wear monitoring unit 700 includes a wear sensor 732. The wear sensor 732 is formed on a wear sensor circuit board 708. The control circuit board 710 for processing signals from the wear sensor circuit board 108 and communicating with remote devices is electrically interconnected to the wear sensor circuit board 708 via a ribbon connector 712. The wear sensor circuit board 708 is attached, such as via an adhesive tape, to wear sensor mounting surface 714 formed on the upper side of the upper wear portion 706 of housing 702, so that it faces upwardly. The wear sensor mounting surface 714 is sized and configured to substantially match the corresponding dimensions of the engaging lower mounting surface 713 of the wear sensor circuit board 708. As shown, the wear sensor circuit board 708 has a generally elongate rectangular shape except that a plurality of generally rectangular extension portions or tabs 709 that are regularly or evenly spaced apart extend outwardly along the inner elongate side 717 thereof. Accordingly, the outer elongate side 715 of the wear sensor circuit board 708 furthest from the belt 20 has a straight configuration and the inner opposite side 717 closest to the belt has a crenellated configuration so that it follows a path similar to a square wave. In particular, each extension portion or tab 709 has an inner edge 754 that is parallel to the opposite outer elongate side 715 and opposing side edges 756 that are orthogonal to the inner edge 754. The spaces between the tabs 709 have an edge 758 recessed back from the inner edges 754 that extends between the adjacent tabs 709 and extends parallel to the inner edges 754. As shown in FIG. 18, the wear sensor circuit board 108 is positioned between the wear sensor mounting surface 714 and the downstream downward facing side or surface 645 of the leg portion 641 of the main blade body 638 with the upstream upward facing side or surface 760 of the wear sensor circuit board 708 in engagement with, and preferably adhesively affixed to, the downstream side 645 of the leg portion 641.

FIGS. 20 and 21 show the wear sensor circuit board 708, which is similarly configured and operates in the same manner as the wear sensor circuit board 108 described with regard to FIGS. 4-8, except as described below. The wear sensor circuit board includes a wear sensor 732, which is formed by a series of spaced-apart conductive lines 134 printed on the wear sensor circuit board 108 which form a series of conductive wear indicator loops 135. As described above, the continuity status of each wear indicator loop 135 is evaluated periodically by the processor 138, with an electrical closed circuit condition of the wear indicator loop 135 indicating structural integrity of the corresponding wear indicator loop portion 135, and an electrical open circuit condition indicating erosion or damage to wear sensor circuit board 108 at that particular wear indicator loop portion 135 location. In the embodiment shown, nine conductive lines 134 are provided, which extend along a length of the elongate wear sensor circuit board 708, except for the four innermost conductive lines 134 which follow a square-wave-like course in order to follow the contours of the extension portions or tabs 709. The conductive lines 134 are evenly spaced apart from the inner side 717 of the wear sensor circuit board 708 to the outer elongate side 715, except where space constraints caused by the gaps between the extension portions 709 do not allow such spacing. The spacing between each conductive line 134 in a direction perpendicular to the length of the lines 134 corresponds to approximately 10% of the height of the scraper blade carbide tips 40.

As in the embodiment shown in FIGS. 13 and 14, because the blade tips 40 extend inwardly toward the belt 20 beyond the upper wear portion 706, the upper wear portion 706 and the wear sensor circuit board 708 are not immediately subject to wear. Instead, unlike the embodiment of FIGS. 2-8, the wear sensor circuit board 708 may not begin to wear such that the innermost conductive line 134 extending along each extension portion 709 is broken until approximately 20% of the blade tip 40 has worn away due to abrasion caused by contact with the conveyor belt 20. In other forms, the wear monitoring unit 700 may be configured to first indicate a corresponding wear amount of the blade tips 40 at different intervals, such as 5%, 10%, 25%, 30%, 40%, 50%, or 75% by adjusting the positioning of the wear sensor circuit board 708 and/or the positioning of the conductive lines 134 relative to the inner scraping edge of the blade tips 40. Although not shown, each of the conductive lines 134 extends along ribbon connector 712 and onto the control circuit board 710, where each conductive line 134 is connected with processing circuitry on a control circuit board 110, such as processor 138, similar to the embodiment of FIGS. 7 and 8.

As previously mentioned, the wear monitoring unit 700 may also be provided as a retrofit unit that is self-contained such that it may be connected to an existing scraper blade 622 and/or suspension arm member 618 in the field without modification to the scraper blade 622 or suspension arm member 618. An adhesive may also be used to more firmly attach at least the upper wear portion 706 of the wear monitoring unit 700 to the downstream side or downwardly facing surface 645 of the scraper blade 622 to inhibit the ingress of dust, debris, or liquids into or onto electrical components or circuitry of the wear monitoring unit 700. In another form, the wear monitoring unit 700 may be pre-attached to the scraper blade 622 and/or suspension arm member 618 prior to use of the modular cleaning unit 626 rather than being retrofit to a modular cleaning unit 626 that is already in use.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A wear monitoring unit for monitoring a wear amount of a scraper blade in contact with a conveyor belt, the wear monitoring unit comprising:
a housing that is distinct from the scraper blade and is configured to be mounted to an exterior of the scraper blade;
a wear sensor operably connected to the housing, the wear sensor configured to indicate the wear amount of the scraper blade; and
a plurality of conductive lines of the wear sensor that are not embedded in the scraper blade but instead are connected to the housing via the wear sensor such that when the housing is mounted to the exterior of the scraper blade, the conductive lines are adjacent and external to the scraper blade and will wear as the scraper blade wears during operation of the conveyor belt.

2. The wear monitoring unit of claim 1, wherein the housing is configured to be retrofit to the scraper blade without any modification to the scraper blade.

3. The wear monitoring unit of claim 1, wherein the wear sensor is operably connected to the housing so that with the housing mounted to the scraper blade, the wear sensor will wear down along with the scraper blade due to contact with the conveyor belt.

4. The wear monitoring unit of claim 1, wherein the housing comprises a wear portion configured to be worn down along with the scraper blade due to contact with the conveyor belt, and the wear sensor is operably connected to the wear portion of the housing such that the wear sensor is also configured to be worn down along with the scraper blade.

5. The wear monitoring unit of claim 1, wherein the scraper blade comprises an upstream side that is configured to face at least partially in a direction opposite to a travel direction of the conveyor belt and a downstream side that is configured to face at least partially in the travel direction of the conveyor belt;
wherein the wear sensor is adjacent to the downstream side of the scraper blade such that the wear sensor is configured to be worn down along with the scraper blade.

6. The wear monitoring unit of claim 1, wherein the wear sensor comprises a circuit board including at least one wear indicator, wherein a portion of the circuit board having the at least one wear indicator is configured to be worn down along with the scraper blade.

7. The wear monitoring unit of claim 6, wherein the wear sensor comprises a crenellated portion including the at least one wear indicator.

8. The wear monitoring unit of claim 7, wherein the crenellated portion comprises a plurality of extension portions and a recess between adjacent ones of the plurality of extension portions and wherein a conductive line of the at least one wear indicator extends onto the plurality of extension portions.

9. The wear monitoring unit of claim 1, further comprising a control circuit operably connected to the wear sensor and operable to wirelessly transmit a signal indicating the wear amount of the scraper blade detected by the wear sensor.

10. The wear monitoring unit of claim 9, wherein the control circuit is sealed to inhibit the ingress of liquid and comprises a magnetically-operated switch operable to activate a processor of the control circuit.

11. The wear monitoring unit of claim 9, wherein the control circuit is configured to operate in a low-power state and to periodically enter an active operating state to transmit a signal indicating the wear amount of the scraper blade detected by the wear sensor.

12. The wear monitoring unit of claim 10, wherein the control circuit comprises a light source configured to indicate an operating status of the control circuit; and
  wherein the housing comprises a transparent or translucent portion to allow the light source to be visible to a user when the light source is illuminated.

13. The wear monitoring unit of claim 1, wherein the housing is configured to be mounted to a blade mount member to which the scraper blade is also mounted and that positions the scraper blade against a conveyor belt.

14. A conveyor belt scraper blade assembly, comprising:
  a scraper blade having a tip portion configured for scraping a surface of a conveyor belt for removing material attached thereon;
  a wear sensor that is distinct from the scraper blade and which is mounted at an exterior surface of the scraper blade prior to use of the scraper blade, the wear sensor configured to indicate a wear amount of the tip portion of the scraper blade; and
  a plurality of conductive lines of the wear sensor that are not embedded in the scraper blade but instead are arranged such that when the wear sensor is mounted to the exterior of the scraper blade, the conductive lines are adjacent and external to the scraper blade and will wear as the scraper blade wears during operation of the conveyor belt.

15. The conveyor belt scraper blade assembly of claim 14, wherein the scraper blade comprises an upstream side that is configured to face at least partially in a direction opposite a conveyor belt travel direction and a downstream side that is configured to face at least partially in the conveyor belt travel direction;
  wherein the wear sensor is at or adjacent to the downstream side of the scraper blade.

16. The conveyor belt scraper blade assembly of claim 14, further comprising a housing operably connected to the scraper blade, wherein the wear sensor is operably connected to the housing at a wear portion thereof, the wear portion configured for being worn down along with the tip portion of the scraper blade.

17. The conveyor belt scraper blade assembly of claim 16, wherein the wear sensor is between the scraper blade and the wear portion of the housing.

18. The conveyor belt scraper blade assembly of claim 16, further comprising a blade mount member configured for positioning the scraper blade in contact with a conveyor belt, wherein the scraper blade is mounted to the blade mount member with at least one fastener and the housing is connected to the blade mount member with the at least one fastener.

19. The conveyor belt scraper blade assembly of claim 14, further comprising a control circuit operably connected to the wear sensor and operable to wirelessly transmit a signal indicating the wear amount of the scraper blade detected by the wear sensor.

20. The conveyor belt scraper blade assembly of claim 19, wherein the control circuit is sealed to inhibit the ingress of liquid and comprises a magnetically-operated switch operable to activate a processor of the control circuit.

21. The conveyor belt scraper blade assembly of claim 19, wherein the control circuit is configured to operate in a low-power state and to periodically enter an active operating state to transmit a signal indicating the wear amount of the scraper blade detected by the wear sensor.

22. The conveyor belt scraper blade assembly of claim 20, further comprising a housing operably connected to the scraper blade;
  wherein the control circuit comprises a light source configured to indicate an operating status of the control circuit; and
  the housing comprises a transparent or translucent portion to allow the light source to be visible to a user when the light source is illuminated.

23. A monitoring system for monitoring a wear amount of a scraper blade for scraping a conveyor belt, the monitoring system comprising:
  a self-contained wear monitoring unit operably connected to an exterior of the scraper blade;
  wherein the self-contained wear monitoring unit comprises:
    a wear sensor configured to indicate the wear amount of the scraper blade;
    a plurality of conductive lines of the wear sensor that are not embedded in the scraper blade and are arranged such that when the self-contained wear monitoring unit is operably connected to the exterior of the scraper blade, the conductive lines are adjacent and external to the scraper blade and will wear as the scraper blade wears during operation of the conveyor belt; and
    a control circuit operably connected to the wear sensor and operable to wirelessly transmit a signal indicating the wear amount of the scraper blade detected by the wear sensor;
  a sensor module positioned and configured for receiving the signal transmitted by the control circuit to detect the wear amount of the scraper blade; and
  communication circuitry operably connected with the sensor module configured to wirelessly transmit data associated with the wear amount of the scraper blade to a communication hub.

24. The monitoring system of claim 23, wherein the control circuit of the self-contained wear monitoring unit and the sensor module are configured to be synchronized with one another to be periodically concurrently operable such that the sensor module is operable to receive the signal transmitted by the control circuit when the signal is transmitted by the control circuit.

25. The monitoring system of claim 23, wherein the communication circuitry is configured to communicate with the communication hub via a cellular communication protocol.

26. The monitoring system of claim 23, further comprising a control system remote from the sensor module configured to receive and store data associated with the wear amount of the scraper blade via the communication hub.

27. The monitoring system of claim 26, wherein the control system is configured to maintain a digital twin of the scraper blade associated with the self-contained wear monitoring unit.

28. The monitoring system of claim 27, wherein the control system is configured to associate an image of the scraper blade with a digital twin of the scraper blade.

29. The monitoring system of claim 27, wherein the control system is configured to associate information transmitted to the control system from a mobile device with the digital twin.

30. The monitoring system of claim 26, wherein the control system is configured to predict when the scraper blade requires replacement based on at least the wear amount of the scraper blade detected by the wear sensor.

31. The monitoring system of claim 23, wherein the sensor module comprises a housing mounted to an elongate support of a conveyor belt cleaner, the elongate support supporting the scraper blade for being engaged with the conveyor belt.

32. A monitoring system for monitoring a wear amount of a scraper blade for scraping a conveyor belt, the monitoring system comprising:
  a self-contained wear monitoring unit operably connected to an exterior of the scraper blade;
  wherein the self-contained wear monitoring unit comprises:
    a wear sensor configured to indicate the wear amount of the scraper blade; and
    a control circuit operably connected to the wear sensor and operable to wirelessly transmit a signal indicating the wear amount of the scraper blade detected by the wear sensor;
    a sensor module positioned and configured for receiving the signal transmitted by the control circuit to detect the wear amount of the scraper blade;
  communication circuitry operably connected with the sensor module configured to wirelessly transmit data associated with the wear amount of the scraper blade to a communication hub; and
  a control system remote from the sensor module configured to receive and store data associated with the wear amount of the scraper blade via the communication hub
  wherein the control system is configured to maintain a digital twin of the scraper blade associated with the self-contained wear monitoring unit, and the digital twin comprises at least one of a serial number associated with the self-contained wear monitoring unit, an installation date of the scraper blade or the self-contained wear monitoring unit, an age of the scraper blade or the self-contained wear monitoring unit, a wear amount of the scraper blade, a wear rate experienced by the self-contained wear monitoring unit, a distance that the conveyor belt has traveled or a length of time the conveyor belt has been running with the scraper blade in engagement with the conveyor belt, an image of the scraper blade, an inspection, repair or replacement date, and a recommended inspection, repair or replacement date.

* * * * *